(12) United States Patent
Lee et al.

(10) Patent No.: US 11,198,508 B2
(45) Date of Patent: Dec. 14, 2021

(54) ELECTRONIC DEVICE MOVED BASED ON DISTANCE FROM EXTERNAL OBJECT AND CONTROL METHOD THEREOF

(71) Applicant: Samsung Electronics Co., Ltd, Suwon-si (KR)

(72) Inventors: Wu Seong Lee, Asan-si (KR); Seung Nyun Kim, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 16/039,203

(22) Filed: Jul. 18, 2018

(65) Prior Publication Data

US 2019/0023395 A1 Jan. 24, 2019

(30) Foreign Application Priority Data

Jul. 18, 2017 (KR) .................. 10-2017-0090893

(51) Int. Cl.
*G06K 9/00* (2006.01)
*B64C 39/02* (2006.01)
(Continued)

(52) U.S. Cl.
CPC ............ *B64C 39/024* (2013.01); *B64D 47/08* (2013.01); *G05D 1/0038* (2013.01);
(Continued)

(58) Field of Classification Search
CPC ............ B64C 39/024; B64C 2201/027; B64C 2201/123; B64C 2201/127;
(Continued)

(56) References Cited

U.S. PATENT DOCUMENTS

| 7,551,980 B2 | 6/2009 | Sakagami et al. |
| 8,554,462 B2 | 10/2013 | Lee et al. |
| 9,145,201 B2 | 9/2015 | Molander et al. |
| 9,164,506 B1 | 10/2015 | Zang |

(Continued)

FOREIGN PATENT DOCUMENTS

| JP | 2004-299025 A | 10/2004 |
| JP | 2014-119828 A | 6/2014 |

(Continued)

OTHER PUBLICATIONS

Office Action dated Jul. 9, 2019 in connection with Japanese Patent Application No. 2018-135168, 12 pages.

(Continued)

*Primary Examiner* — Tom Y Lu

(57) ABSTRACT

An electronic device is disclosed. The electronic device includes a sensor, an actuator, and a processor. The sensor is configured to sense at least one external object in a direction of 360 degrees outside the electronic device. The actuator configured to allow the electronic device to move or yaw. The processor is configured to verify an angle corresponding to a location of the at least one external object among the 360 degrees and a distance between the at least one external object and the electronic device using the sensor. When the distance does not belong to a specified range, the processor is also configured to move the electronic device in a direction corresponding to the angle using the actuator such that the distance belongs to the specified range.

10 Claims, 26 Drawing Sheets

(51) Int. Cl.
  *G05D 1/00* (2006.01)
  *G05D 1/08* (2006.01)
  *G06T 7/292* (2017.01)
  *G08G 5/00* (2006.01)
  *G06T 7/593* (2017.01)
  *B64D 47/08* (2006.01)
  *G06T 7/285* (2017.01)
  *G06T 7/246* (2017.01)

(52) U.S. Cl.
  CPC ......... *G05D 1/0088* (2013.01); *G05D 1/0094* (2013.01); *G05D 1/0808* (2013.01); *G06K 9/0063* (2013.01); *G06K 9/00664* (2013.01); *G06T 7/248* (2017.01); *G06T 7/285* (2017.01); *G06T 7/292* (2017.01); *G06T 7/596* (2017.01); *G08G 5/0013* (2013.01); *G08G 5/0069* (2013.01); *G08G 5/0086* (2013.01); *B64C 2201/127* (2013.01); *B64C 2201/145* (2013.01); *G06T 2207/10021* (2013.01); *G06T 2207/10032* (2013.01); *G06T 2207/30196* (2013.01); *G06T 2207/30221* (2013.01); *G06T 2207/30241* (2013.01)

(58) Field of Classification Search
  CPC ......... B64C 2201/14; B64C 2201/145; B64D 47/08; G05D 1/0038; G05D 1/0088; G05D 1/0094; G05D 1/0808; G06K 9/0063; G06K 9/00664; G06T 2207/10032; G06T 2207/30196; G06T 2207/30221; G06T 2207/30241; G06T 7/248; G06T 7/285; G06T 7/292; G06T 7/596; G08G 5/0013; G08G 5/0069; G08G 5/0086
  See application file for complete search history.

(56) References Cited

U.S. PATENT DOCUMENTS

| | | | |
|---|---|---|---|
| 9,567,078 | B2 | 2/2017 | Zang |
| 9,846,429 | B2 | 12/2017 | Zang |
| 2012/0296497 | A1 | 11/2012 | Lee et al. |
| 2014/0200744 | A1 | 7/2014 | Molander et al. |
| 2014/0327733 | A1 | 11/2014 | Wagreich |
| 2015/0370250 | A1 | 12/2015 | Bachrach et al. |
| 2016/0031559 | A1 | 2/2016 | Zang |
| 2017/0023938 | A1 | 1/2017 | Zang |
| 2017/0032175 | A1 | 2/2017 | Lee et al. |
| 2017/0068246 | A1 | 3/2017 | Zang |
| 2017/0108877 | A1 | 4/2017 | Zang |
| 2017/0127652 | A1* | 5/2017 | Shen .................. G06K 9/0063 |
| 2017/0160751 | A1 | 6/2017 | Pierce et al. |
| 2017/0322551 | A1 | 11/2017 | Zang |
| 2018/0046187 | A1* | 2/2018 | Martirosyan ........ G05D 1/0094 |
| 2018/0173220 | A1* | 6/2018 | Wang .................... G06F 3/017 |
| 2019/0258255 | A1* | 8/2019 | Nagayama ......... H04N 5/23296 |
| 2020/0097025 | A1* | 3/2020 | Zhang .................. B64C 39/024 |

FOREIGN PATENT DOCUMENTS

| | | |
|---|---|---|
| JP | 2014-119901 A | 6/2014 |
| JP | 2014-149621 A | 8/2014 |
| JP | 2015-002522 A | 1/2015 |
| JP | 2015-207149 A | 11/2015 |
| JP | 2016-212465 A | 12/2016 |
| JP | 2017-503226 A | 1/2017 |
| JP | 2017-068298 A | 4/2017 |
| WO | 2014119991 A1 | 8/2014 |
| WO | 2017/096548 A1 | 6/2017 |

OTHER PUBLICATIONS

ISA/KR, "International Search Report and Written Opinion of the International Searching Authority," International Application No. PCT/KR2018/006522, dated Sep. 12, 2018, 13 pages.

* cited by examiner

<SUBJECT MOVES WITHIN SPECIFIED DISTANCE RANGE>

TOP VIEW TRACKING OF SUBJECT (LIMIT SECOND HEADING ANGLE)

ELECTRONIC DEVICE MOVED BASED ON DISTANCE FROM EXTERNAL OBJECT AND CONTROL METHOD THEREOF

CROSS-REFERENCE TO RELATED APPLICATION AND CLAIM OF PRIORITY

This application is based on and claims priority under 35 U.S.C. § 119 to Korean Patent Application No. 10-2017-0090893 filed on Jul. 18, 2017 in the Korean Intellectual Property Office, the disclosure of which is incorporated by reference herein its entirety.

BACKGROUND

1. Field

The present disclosure relates to flight control technologies for object tracking of an unmanned aerial vehicle (UAV).

2. Description of Related Art

A UAV having a camera may capture an image of a subject while tracking the subject. For example, the UAV may verify a distance from the subject using global positioning system (GPS) information of each of the UAV and the subject and may move such that the verified distance is within a specified range. For another example, the UAV may verify a distance from a subject based on a size or shape of the subject on an image in which the subject is captured and may move such that the verified distance is within a specified range.

The UAV may have one camera and may track a subject such that the subject is within an angle of view of the camera. For example, when the subject departs from the angle of view of the subject, the UAV may yaw to face the subject and may locate the subject within the angle of view by moving to be close to the subject.

The above information is presented as background information only to assist with an understanding of the present disclosure. No determination has been made, and no assertion is made, as to whether any of the above might be applicable as prior art with regard to the present disclosure.

SUMMARY

A UAV may have a plurality of cameras and may be configured to perform omnidirectional image capture. It may be unnecessary for the UAV capable of performing the omnidirectional image capture to yaw to locate a subject within an angle of view of the camera (e.g., a heading of the UAV), or the UAV may have the smaller number of yawing than the related art. Thus, the UAV capable of performing the omnidirectional image capture may be controlled to be different from a UAV having one camera to enhance efficiency of controlling a fuselage of the UAV.

Aspects of the present disclosure are to address at least the above-mentioned problems and/or disadvantages and to provide at least the advantages described below. Accordingly, an aspect of the present disclosure is to provide a UAV for providing a tracking technique of the UAV capable of detecting a 360-degree direction and a flight control method thereof.

In accordance with an aspect of the present disclosure, an electronic device is provided. The electronic device may include a sensor configured to sense at least one external object in the direction of 360 degrees outside the electronic device, an actuator configured to allow the electronic device to move or yaw, and a processor. The processor may be configured to verify an angle corresponding to a location of the at least one external object among the 360 degrees and a distance between the at least one external object and the electronic device using the sensor and, when the distance does not belong to a specified range, move the electronic device in a direction corresponding to the angle using the actuator such that the distance belongs to the specified range.

In accordance with another aspect of the present disclosure, an electronic device is provided. The electronic device may include a housing, a plurality of cameras configured to be located in a plurality of regions of the housing and obtain a plurality of images for a plurality of directions, an actuator configured to be located on at least one side of the housing and support at least one of hovering, movement, or yawing of the electronic device, a processor configured to be electrically connected with the plurality of cameras and the actuator, and a memory configured to be electrically connected with the processor. The memory may store instructions configured to cause the processor to detect at least one external object located in at least one of a plurality of directions relative to one point of the housing using the plurality of cameras, verify an angle corresponding to a location where the at least one detected external object is located and a distance between the at least one external object and the electronic device, when the distance does not belong to a specified range, move the electronic device in a direction corresponding to the angle using the actuator such that the distance belongs to the specified range, and generate an omnidirectional image using the plurality of images obtained using the plurality of cameras.

According to embodiments disclosed in the present disclosure, a UAV may enhance the tracking efficiency of the UAV capable of detecting a 360-degree direction.

According to embodiments disclosed in the present disclosure, when the UAV capable of detecting a 360-degree direction tracks an object, the UAV may optimize flight or motion of the UAV.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
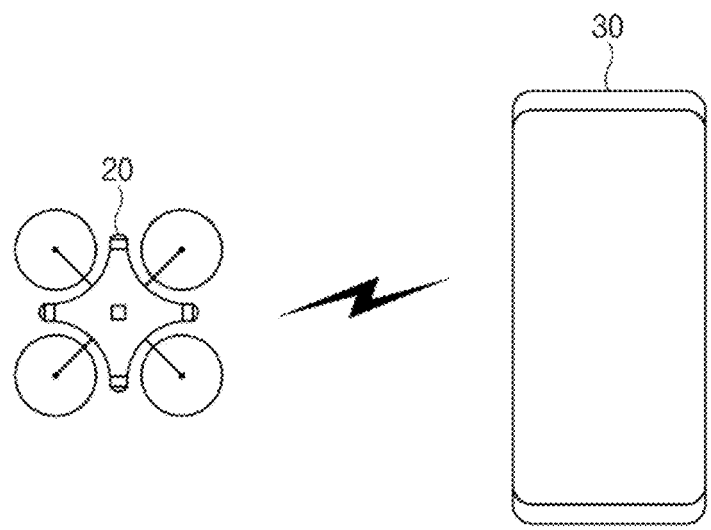
FIG. 1 illustrates a drawing of a configuration of an unmanned flight control system according to an embodiment of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of" "designed to", or "adapted to". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HOME-SYNC, APPLE TV or GOOGLE TV), a game console (e.g., XBOX or PLAYSTATION), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a drawing of a configuration of an unmanned flight control system according to an embodiment of the present disclosure.

Referring to FIG. 1, the unmanned flight control system according to an embodiment may include an unmanned aerial vehicle (UAV) 20 and a remote control device 30. The UAV 20 may be, for example, a 360-degree drone capable of capturing an image in all orientations (e.g., a 360-degree direction) with respect to the UAV 20. The remote control device 30 may include at least one of, for example, a portable communication device (e.g., a smartphone), a computer device (e.g., a personal digital assistant (PDA), a tablet personal computer (PC), or a laptop PC), a portable multimedia device, a camera, or a wearable device. The wearable device may include at least one of accessory-type devices (e.g., a watch, a ring, a bracelet, an anklet, a necklace, glasses, contact lenses, or a head mounted device (HMD)).

According to an embodiment, the UAV 20 may have a plurality of cameras and may generate an image for each direction using each of the plurality of cameras. The UAV 20 may generate an omnidirectional image using a plurality of images obtained using the plurality of cameras. For example, the UAV 20 may map pixels (e.g., pixel images) included in the plurality of images onto a virtual spherical surface relative to the UAV 20 and may verify a horizontal heading angle (e.g., a first heading angle) and a vertical heading angle (e.g., a second heading angle) relative to a heading of the UAV 20 on the virtual spherical surface. The horizontal heading angle may be, for example, a value obtained by measuring an angle between the heading of the UAV 20 and each pixel in a horizontal direction of the UAV 20. The vertical heading angle may be, for example, a value obtained by measuring an angle between the heading of the UAV 20 and each pixel in a vertical direction of the UAV 20. The UAV 20 may generate an omnidirectional image by mapping respective pixels onto a virtual coordinate system to correspond to the first and second heading angles verified for each pixel. A horizontal axis of the virtual coordinate system (an orientation coordinate system) may be configured with 0 degree to 360 degrees corresponding to angle of a lateral direction outside the UAV 20, and a vertical axis of the virtual coordinate system may be configured with −90 to +90 corresponding to a longitudinal directions of the UAV 20. The method for generating the omnidirectional image may be performed by using various other methods which are well known.

According to an embodiment, when generating at least one omnidirectional image, the UAV 20 may detect a subject included in the omnidirectional image and may generate subject information associated with the detected subject. The subject information may include, for example, information about a region size of the subject and information about a heading angle of the subject. The UAV 20 may transmit at least one of the omnidirectional image, information about a matching relationship between the omnidirectional image and a virtual coordinate system, or the subject information to the remote control device 30.

According to an embodiment, when receiving the at least one of the omnidirectional image, the information about the matching relationship between the omnidirectional image and the virtual coordinate system, or the subject information, the remote control device 30 may output a UI screen capable of setting at least one of a tracking target or a tracking region. When the at least one of the tracking target or the tracking region is set through the UI screen, the remote control device 30 may transmit at least one of information about the set tracking target or information about the set tracking region to the UAV 20. The information about the tracking object may include information indicating at least one of, for example, a heading angle, a region, and a size of a subject to be tracked. The information about the set tracking region may include a heading angle range to be tracked.

According to an embodiment, the UAV 20 may verify a subject to be tracked from tracking target information and may verify a heading angle range to be tracked from tracking region information. The UAV 20 may further verify a distance range to be tracked from tracking region information or default configuration information.

According to an embodiment, while generating an omnidirectional image, the UAV 20 may calculate a distance between the UAV 20 and a subject to be tracked, based on the omnidirectional image or a plurality of images. Further, the UAV 20 may calculate a heading angle of the subject relative to the UAV 20 based on the omnidirectional image.

According to an embodiment, the UAV 20 may control its operation (e.g., its flight) such that a specified subject is within a specified heading angle range and a specified distance range. For example, when the specified subject is not moved or is moved within the specified heading angle range and the specified distance range, the UAV 20 may fail to control its movement. For another example, when the specified subject departs from at least one of the specified heading angle range and the specified distance range, the UAV 20 may move in a straight line such that the specified subject is located within the specified heading angle range and the specified distance range. Herein, when the specified subject is not located within the specified heading angle range or the specified distance range after moving in the straight line, the UAV 20 may move in the straight line and may then yaw such that the specified subject is located within the specified heading angle range or the specified distance range.

According to an embodiment, the UAV 20 may control its flight such that a plurality of subjects to be tracked are located within a specified distance range and a specified heading angle range. When at least one of the plurality of subjects is unable to be located within the specified distance range and the specified heading angle range, the UAV 20 may control its flight such that at least some of the plurality of subjects are located within the specified distance range and the specified heading angle range. For example, the UAV 20 may determine at least some of the plurality of subjects based on a distance between the plurality of subjects and the UAV 20 and a distance between the plurality of subjects. For another example, the UAV 20 may determine at least some of the plurality of subjects based on a distance between the plurality of subjects and the UAV 20 and priorities of the plurality of subjects.

In an embodiment, in omnidirectionally capturing or detecting a subject, the UAV 20 may enhance unnecessary yawing upon omnidirectional tracking and may track a plurality of subjects located in a plurality of directions with respect to the UAV 20.

Figure 2:
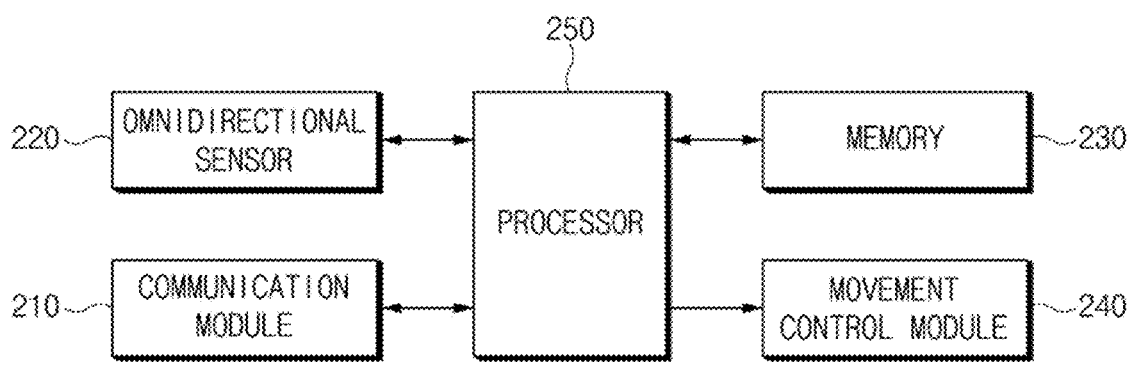
FIG. 2 illustrates a block diagram of a configuration of a UAV according to various embodiments of the present disclosure.

FIG. 2 illustrates a block diagram of a configuration of a UAV according to various embodiments of the present disclosure.

Referring to FIG. 2, a UAV 20 may include a movement control module 240, a communication module 210, an omnidirectional sensor 220, a memory 230, and a processor 250. The movement control module 240, the communication module 210, the omnidirectional sensor 220, the memory 230, and the processor 250 may be received or mounted on a housing of the UAV 20. In an embodiment, the UAV 20 may fail to include some of the elements or may further include other element(s). In an embodiment, some of the elements of the UAV 20 may be combined with each other to be configured as one entity. The UAV 20 may perform functions of the elements before the combination in the same manner. The input and output relationship shown in FIG. 2 may be, but is not limited to, only an example for convenience of description.

According to an embodiment, the movement control module 240 may fly the UAV 20 from the ground based on instructions of the processor 250 to perform hovering (or hovering flight), movement, or yawing. The movement control module 240 may include a plurality of propellers, an actuator, a flight controller, and the like. For example, the flight controller may control roll, pitch, yaw, throttle, or the like of the UAV 20 by controlling the actuator depending on a received adjustment signal (location and attitude information). For another example, the movement control module 240 may control distance movement, a change in altitude, and a change in azimuth based on a received adjustment signal (distance movement, a change in altitude, a horizontal and azimuth command, and the like). The flight controller may be included in, for example, the processor 250.

According to an embodiment, the communication module 210 may communicate with an external electronic device (e.g., a remote control device 30 of FIG. 1) depending on instructions of the processor 250. For example, when receiving data from the processor 250, the communication module 210 may convert the received data into data of a specified communication protocol and may transmit the converted data over a specified communication channel. When receiving data from the specified communication channel, the communication module 210 may convert the received data in the form of being analyzable by the processor 250 and may output the converted data. In an embodiment, the communication module 210 may transmit at least one of an omnidirectional image, mapping information between the omnidirectional image and a virtual coordinate system, or subject information.

According to an embodiment, the omnidirectional sensor 220 may include a plurality of cameras and may capture each image in an angle of view of each of the plurality of cameras to generate a plurality of images. Each of the plurality of cameras may be included in the UAV 20 to capture an image in all orientations (a 360-degree direction) including a lateral direction and a longitudinal direction outside the UAV 20.

The memory 230 may be a volatile memory (e.g., a random access memory (RAM) or the like), a nonvolatile memory (e.g., a read only memory (ROM), a flash memory, or the like), or a combination thereof. The memory 230 may store instructions or data associated with at least one other element(s) of the UAV 20. According to an embodiment, the memory 230 may store instructions for tracking a subject. In addition, the memory 230 may store instructions for generating an omnidirectional image by synthesizing images received from the omnidirectional sensor 220.

The processor 250 may include at least one of, for example, a central processing unit (CPU), a graphic processing unit (GPU), a microprocessor, an application processor, an application specific integrated circuit (ASIC), or field programmable gate arrays (FPGA) and may have a plurality of cores. The processor 250 may execute an arithmetic operation or data processing associated with control and/or communication of at least one other element(s) of the UAV 20.

According to an embodiment, when receiving an instruction to capture an image of an omnidirectional tracking region, the processor 250 may allow the UAV 20 to hover (or perform hovering flight) through the movement control module 240. The instruction to capture an image of an omnidirectional tracking region may be received via, for example, the communication module 210 from the remote control device 30. Alternatively, the instruction to capture an image of an omnidirectional tracking region may be received from, for example, a switch included in the UAV 20 as a user operates the switch.

According to an embodiment, while controlling hovering of the UAV 20, the processor 250 may capture a plurality of images through the omnidirectional sensor 220 (e.g., a camera) and may generate an omnidirectional image by combining the plurality of images, duplication of which is removed. For example, while removing duplication of pixel images included in a plurality of images, the processor 250 may map the pixel images onto a virtual spherical surface and may verify a horizontal heading angle (e.g., a first heading angle) and a vertical heading angle (e.g., a second heading angle) of each pixel relative to a heading of the UAV 20 on the virtual spherical surface. The processor 250 may generate an omnidirectional image by mapping each pixel to a location, corresponding to a heading angle verified for each pixel on a virtual coordinate system, on the virtual coordinate system. A horizontal axis of the virtual coordinate system (an orientation coordinate system) may be configured with 0 degree to 360 degrees corresponding to an angle of a lateral direction outside the UAV 20, and a vertical axis of the virtual coordinate system may be configured with −90 to +90 corresponding to a longitudinal direction outside the UAV 20. The omnidirectional image may be configured by stitching, for example, a plurality of images in the shape of a cylinder. As at least some of pixels included in the omnidirectional image are mapped onto the virtual coordinate system, they may have an orientation coordinate value. The first heading angle (0°≤first heading angle≤360°) may be, for example, a value obtained by measuring an angle between a heading of the UAV 20 and each pixel in a horizontal direction of the UAV 20. The second heading angle (−90°≤second heading angle≤+90°) may be, for example, a value obtained by measuring an angle between a heading of the UAV 20 and each pixel in a vertical direction of the UAV 20.

According to an embodiment, the processor 250 may detect a subject (an external object) from an omnidirectional image and may generate subject information about the detected subject. For example, the processor 250 may selectively detect a subject of a specified size or more among subjects included in the omnidirectional image. The subject information may be, for example, information about a size and a heading angle of the subject. The subject information may include at least one of a size of the detected subject, a first heading angle of the subject, or a second heading angle of the subject. The subject information may be a heading angle of at least a portion of the subject. The at least portion of the subject may be the center of the entire region of the subject or the center of one region of the subject.

According to an embodiment, the processor 250 may transmit information for setting a tracking region, including an omnidirectional image, information about a mapping relationship between the omnidirectional image and a virtual coordinate system, or subject information, to the remote control device 30 via the communication module 210. In an embodiment, when receiving the information for setting the tracking region, the remote control device 30 may display a UI capable of setting at least one of a tracking target or a tracking region based on the information for setting the tracking region. The remote control device 30 may verify settings of the tracking target and the tracking region based on a user input to the displayed UI and may transmit tracking target information and tracking region information. The tracking target information may be, for example, information about a subject to be tracked on an omnidirectional image. The tracking region information may include specified first and second heading angle ranges (to be tracked). The first and second heading angle ranges may be set to various ranges such as an omnidirectional region range, a top view region range, a front region range, a rear region range, or a specific region range. The tracking region information may further include a distance range from a subject to be tracked.

According to an embodiment, when receiving the tracking target information, the processor 250 may verify first and second heading angles of a specified subject from the tracking target information. When receiving the tracking region information, the processor 250 may verify an angle range to be tracked from the tracking region information. The processor 250 may further verify a distance range to be tracked from the tracking region information. The processor 250 may verify a distance range to be tracked from default configuration information stored in the memory 230.

According to an embodiment, the processor 250 may calculate a distance between the UAV 20 and a subject to be tracked (hereinafter referred to as "a distance of the subject") based on an omnidirectional image (or a plurality of images). For example, the processor 250 may detect an area of the subject from the omnidirectional image and may calculate a distance between the UAV 20 and the subject using a change in the detected area. For another example, the processor 250 may detect a feature point of the subject on the omnidirectional image and may calculate a distance between the UAV 20 and the subject using a change in the detected feature point. For another example, the processor 250 may detect an edge of the subject from the omnidirectional image and may calculate a distance between the UAV 20 and the subject using a change in the detected edge. The method of calculating the distance from the subject using the omnidirectional image (or the plurality of images) at the processor 250 is not limited thereto and may be performed by using various other methods in a separate or complex manner.

According to an embodiment, the processor 250 may calculate first and second heading angles of the subject relative to the UAV 20 based on the omnidirectional image. The first and second heading angles of the subject may be calculated on the basis of, for example, one feature point of the subject (e.g., the center of the entire region or the center of a face)

According to an embodiment, when a specified heading angle range includes all orientations (a 360-degree direction), the processor 250 may generate an adjustment signal of the UAV 20 such that a specified subject is within a specified distance range through the movement control module 240. For example, the processor 250 may verify a distance between the specified subject and the UAV 20 and first and second heading angles of the specified subject relative to the UAV 20. The processor 250 may verify whether the verified distance belongs to a specified range. When the verified distance belongs to the specified range, the processor 250 may control movement (e.g., hovering or hovering flight) of the UAV 20 such that the UAV 20 maintains a current location. When the verified distance departs from the specified range, the processor 250 may move the UAV 20 in a straight line in a direction corresponding to the first heading angle using the movement control module 240 such that the verified distance belongs to the specified range.

According to an embodiment, when a specified heading angle range is a portion (e.g., less than 360 degrees) of all orientations, the processor 250 may generate an adjustment signal of the UAV 20 such that a specified subject is within the specified heading angle range and a specified distance range. For example, when the specified subject is within the specified heading angle range and when a distance from the specified subject belongs to the specified distance range, the processor 250 may generate an adjustment signal for enabling the UAV 20 to hover. For another example, when first and second heading angles of the specified subject belong to a specified heading angle range and when the distance from the specified subject does not belong to the specified distance range, the processor 250 may move the UAV 20 (e.g., move the UAV 20 in a straight line) in a direction corresponding to at least one of the first heading angle or the second heading angle of the specified subject such that the distance from the specified subject belongs to the specified distance range. For another example, when the distance from the specified subject belongs to the specified distance range and when the specified subject departs from the specified heading angle range, the processor 250 may control at least one of an attitude or a movement (flight) of the UAV 20 such that the first and second heading angles of the specified subject belong to the specified heading angle range.

According to an embodiment, when tracking a subject in a specified heading angle range, the processor 250 may use a distance range different from when omnidirectionally tracking the subject. For example, when tracking the subject in the specified heading angle range, the processor 250 may use a second specified distance range which is wider than a first specified distance range used when omnidirectionally tracking the subject.

According to an embodiment, the processor 250 may move the UAV 20 to a location suitable for capturing an image of a subject among locations corresponding to a specified distance range and a specified heading angle range when controlling movement of the UAV 20. For example, when a specified subject is a person, the processor 250 may move the UAV 20 to a location suitable for capturing an image of a portion of the subject (e.g., a face of the person) among locations corresponding to a specified distance range and a specified heading angle range. The location suitable for capturing the image of the portion of the subject may include, for example, a location where a specified feature point of an external object is able be captured to be relatively larger.

According to an embodiment, the processor 250 may continue tracking a subject until receiving an instruction to end image capture from the remote control device 30. In this process, the processor 250 may determine a movement direction of the UAV 20 based on a first heading angle of the subject. The processor 250 may determine an altitude of the UAV 20 based on a second heading angle of the subject. The processor 250 may determine a speed of the UAV 20 based on a change in distance from the subject. The processor 250 may generate an adjustment signal of the UAV 20 depending on the determined movement direction, altitude, or speed.

According to an embodiment, the processor 250 may verify a plurality of subjects as targets to be tracked, from tracking target information. The processor 250 may verify a distance between each of the plurality of subjects and the UAV 20 and first and second heading angles of each of the plurality of subjects.

According to an embodiment, when a tracking region for the plurality of subjects is an omnidirectional region, the processor 250 may generate an adjustment signal of the UAV 20 such that a distance between the UAV 20 and each of the plurality of verified subjects belongs to a specified distance range. For example, when a plurality of calculated distances do not belong to the specified distance range, the processor 250 may control movement (e.g., hovering) of the UAV 20 such that the plurality of calculated distances belong to the specified distance range. For another example, when at least one of the plurality of distances does not belong to a second specified distance range, the processor 250 may calculate a location where the plurality of distances belong to the second specified distance range and where a deviation between the plurality of distances is able to be reduced and may move the UAV 20 (e.g., move the UAV 20 in a straight line) in a direction corresponding to an angle of the calculated location.

According to an embodiment, when tracking the plurality of subjects, the processor 250 may use a distance range different from when tracking one subject. For example, the second specified distance range may be the same as a specified distance range or may be wider than the specified distance range.

According to an embodiment, when the processor 250 is unable to calculate the location where the plurality of distances belong to the second specified distance range and where the deviation between the plurality of distances is able to be reduced, it may generate an adjustment signal of the UAV 20 based on at least one of distances of the plurality of subjects and a plurality of priorities of the plurality of subjects. For example, the processor 250 may calculate a second location where the plurality of distances do not belong to the second specified distance range, but where the deviation between the plurality of distances is able to be reduced and may verify a distance between each of the plurality of subjects and the second location. The processor 250 may select a subject where the distance between each of the plurality of subjects and the second location belongs to the second specified distance range and may calculate an angle of a third location capable of detecting the selected subject, thus moving the UAV 20 in a straight line in a direction corresponding to the angle of the third location. For another example, when the processor 250 is unable to calculate the location where the plurality of distances belong to the second specified distance range and where the deviation between the plurality of distances is able to be reduced, it may verify priorities of the plurality of subjects. The priorities of the plurality of subjects may be verified from, for example, tracking target information. The processor 250 may calculate a second location where a distance between each of a plurality of subjects except for at least one subject with a relatively low priority and the UAV 20 belongs to the second specified distance range. The processor 250 may move the UAV 20 in a straight line in a direction corresponding to an angle of the second location. According to various embodiments, the processor 250 may select a target to be tracked among a plurality of subjects using a deep learning algorithm such as a clustering algorithm, an object recognition algorithm, or a convolution neural network (CNN).

According to an embodiment, when a tracking region for the plurality of subjects is within a partial heading angle range, the processor 250 may generate an adjustment signal of the UAV 20 such that the plurality of subjects are within a specified distance range and belong to a specified heading angle range. Since a detailed configuration of generating the adjustment signal at the processor 250 when the tracking region for the plurality of subjects is within the partial heading angle range is able to be easily derived from a technique of tracking one subject and a technique of omnidirectionally tracking a plurality of subjects by those skilled in the art, a detailed description for the detailed configuration will be omitted.

According to an embodiment, when a tracking target is changed (e.g., added or deleted), the processor 250 may set flight of the UAV 20 based on a distance from the changed tracking target.

In the above-mentioned embodiment, an embodiment is exemplified as the processor 250 verifies the distance from the subject using the image captured by the omnidirectional sensor 220. However, in contrast, when each of the UAV 20 and a subject includes a global positioning system (GPS) module, a distance between the UAV 20 and the subject may be calculated using GPS coordinates obtained using the GPS modules respectively included in the UAV 20 and the subject.

In the above-mentioned embodiment, an embodiment is exemplified as the omnidirectional sensor 220 of the UAV 20 is implemented as a camera. According to various embodiments, the omnidirectional sensor 220 may be replaced with a distance sensor or may be implemented as a combination of a camera and a distance sensor. For example, the omnidirectional sensor 220 may include at least one of an image sensor (e.g., a camera), a light detection and ranging (LiDAR), a radar, or an infrared sensor, which is capable of recognizing an object. The processor 250 according to an embodiment may prevent subjects included in an omnidirectional image from becoming too small in size by tracking the other subjects except for a subject further away from the UAV 20 than other subjects among the plurality of subjects. For example, the processor 250 may set (or virtually set) a first region including the plurality of subjects (e.g., 4 subjects) and may track the subjects included in the first region. In this operation, the processor 250 may track a distance between the UAV 20 and each of the subjects. When the specific subject is away from the UAV 20 over a specified distance, the processor 250 may set a second region including the other subjects (e.g., 3 subjects) except for the specific subject and may track the subjects included in the second region. According to various embodiments, the processor 250 may track a distance between subjects. When a distance between a specific subject and each of the other subjects is away from each other over a specified distance, the processor 250 may set a second region including the other subjects except for the specific subject and may track the subjects included in the second region. According to various embodiments, the processor 250 may control an image capture distance between the UAV 20 and each of the subjects to be within a specified distance, such that a size of each of the subjects included in the first region or the second region is over a constant size.

Figure 3:
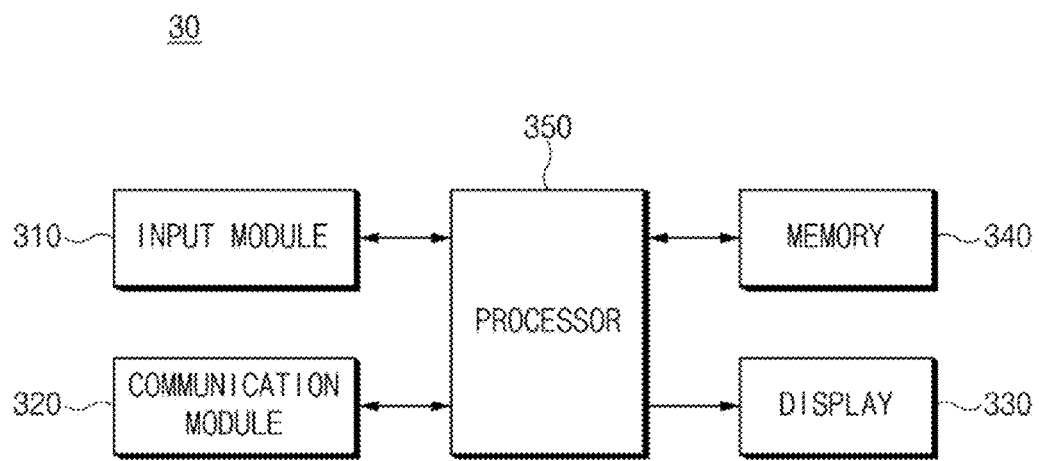
FIG. 3 illustrates a block diagram of a configuration of a remote control device according to an embodiment of the present disclosure.

FIG. 3 illustrates a block diagram of a configuration of a remote control device according to an embodiment of the present disclosure.

Referring to FIG. 3, a remote control device 30 according to an embodiment may include an input module 310, a communication module 320, a display 330, a memory 340, and a processor 350. In an embodiment, the remote control device 30 may fail to include some of the elements or may further include other element(s). In an embodiment, some of the elements of the remote control device 30 may be combined with each other to be configured as one entity. The remote control device 30 may perform functions of the elements before the combination in the same manner. The input and output relationship shown in FIG. 3 may be, but is not limited to, only an example for convenience of description.

According to an embodiment, the input module 310 may detect or receive a user input for setting at least one of a tracking region or a tracking target. The input module 310 may be, for example, a touch sensor installed on a touch screen.

According to an embodiment, the communication module 320 may communicate with a UAV 20 of FIG. 2 depending on instructions of the processor 350. For example, the communication module 320 may convert information for setting a tracking region, received from the UAV 20, into a form analyzable by the processor 350. For another example, the communication module 320 may convert at least one of tracking region information or tracking target information, received from the processor 350, under a specified communication protocol and may transmit the converted information over a specified communication channel.

The display 330 may include, for example, a liquid crystal display (LCD), a light emitting diode (LED) display, an organic LED (OLED) display, a microelectromechanical systems (MEMS) display, or an electronic paper display. The display 330 may display, for example, a variety of content (e.g., a text, an image, a video, an icon, a symbol, and/or the like) to a user. According to an embodiment, the display 330 may display an omnidirectional image mapped onto a virtual coordinate system depending on instructions of the processor 350. The display 330 may display a menu and a UI screen for setting a tracking region, a tracking target, or a tracking priority depending on instructions of the processor 350.

The memory 340 may be a volatile memory (e.g., a RAM or the like), a nonvolatile memory (e.g., a ROM, a flash memory, or the like), or a combination thereof. The memory 340 may store instructions or data associated with at least one other element(s) of the remote control device 30. According to an embodiment, the memory 340 may store instructions for outputting at least one of a menu and a UI screen for setting a tracking region, a tracking target, or a tracking priority.

According to an embodiment, the processor 350 may receive information for setting a tracking region from the UAV 20 via the communication module 320. The information for setting a tracking region may include an omnidirectional image, mapping information between the omnidirectional image and a virtual coordinate system, or subject information.

According to an embodiment, the processor 350 may output a UI screen capable of setting a tracking region or a tracking target using the information for setting the tracking region on the display 330 and may verify at least one of the tracking region or the tracking target set through the UI screen. For example, the processor 350 may generate an omnidirectional image mapped onto the virtual coordinate system using the information for setting the tracking region and may output the generated omnidirectional image on the display 330. When a tracking region setting menu is selected through the input module 310 while the omnidirectional image is output, the processor 350 may output a menu capable of selecting a plurality of specified tracking regions and may verify a tracking region selected through the output menu. For another example, when a subject setting menu is selected through the input module 310, the processor 350 may verify at least one subject selected among subjects included in an omnidirectional image as a tracking target.

According to an embodiment, when a tracking region is set, the processor 350 may output a UI screen, for providing a notification that a tracking target is displayed on any region of an image of a globular shape generated from an omnidirectional image, on the display 330. For example, when tracking targets are a plurality of subjects, the processor 350 may output a UI screen for providing a notification that the plurality of subjects are located on any region of the image of the globular shape.

According to an embodiment, when the tracking targets are the plurality of subjects, the processor 350 may further provide a UI screen capable of setting a priority of at least one of the plurality of subjects.

According to an embodiment, the processor 350 may transmit tracking region information corresponding to the set tracking region or tracking target information corresponding to a tracking target to the UAV 20 via the communication module 320.

According to an embodiment, the processor 350 may generate an image of a globular shape using an omnidirectional image and may output the image of the globular shape. Alternatively, the processor 350 may transmit the image of the globular shape to a wearable device (e.g., a virtual reality (VR) device) via the communication module 320 or the like.

In an embodiment, the processor 350 may provide a UI screen capable of setting a tracking target or a tracking region of the UAV 20 to enhance convenience of setting the tracking target and the tracking region.

Figure 4A:
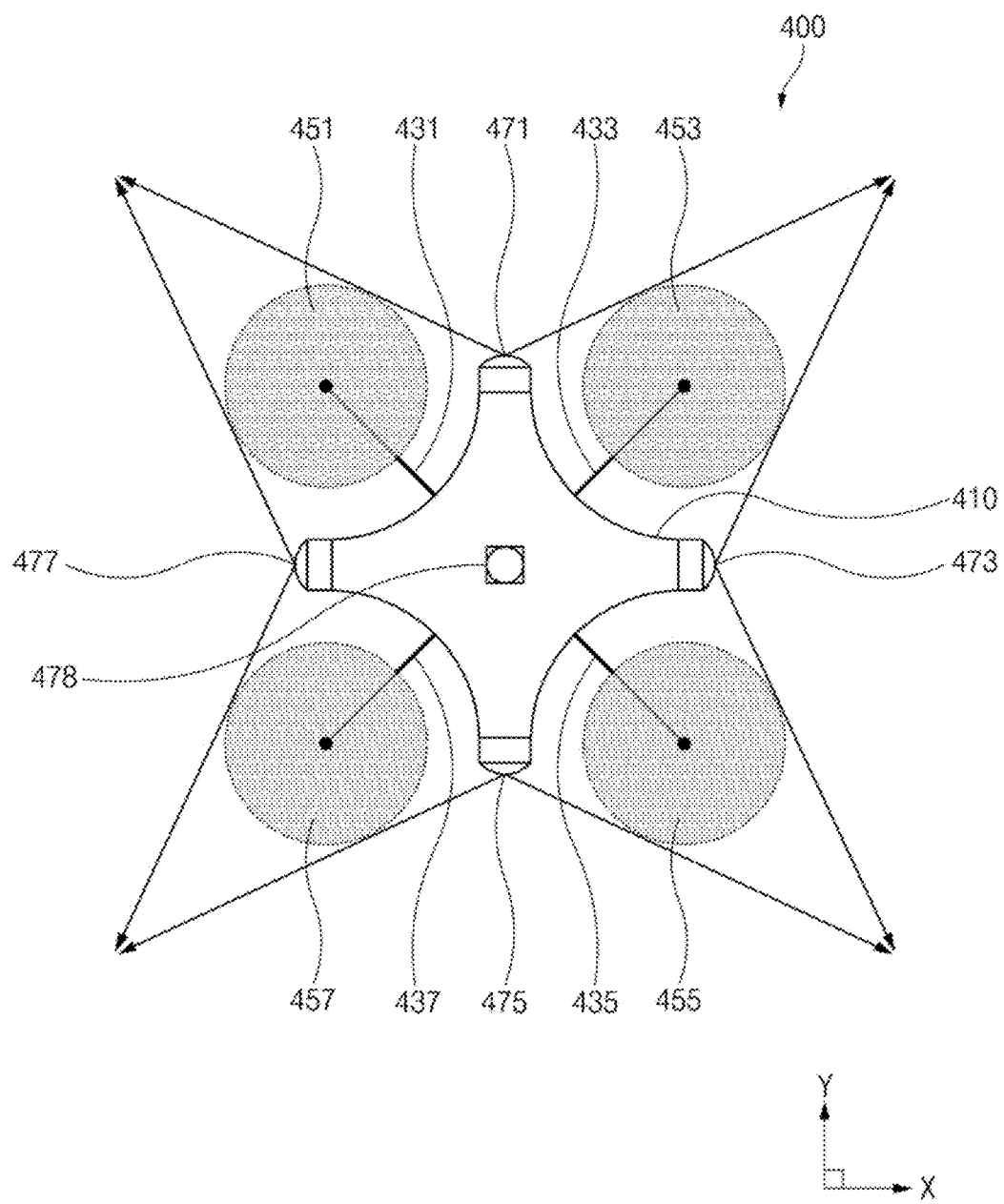
FIG. 4A illustrates a plane view of a UAV having a second structure according to an embodiment of the present disclosure.
Figure 4B:
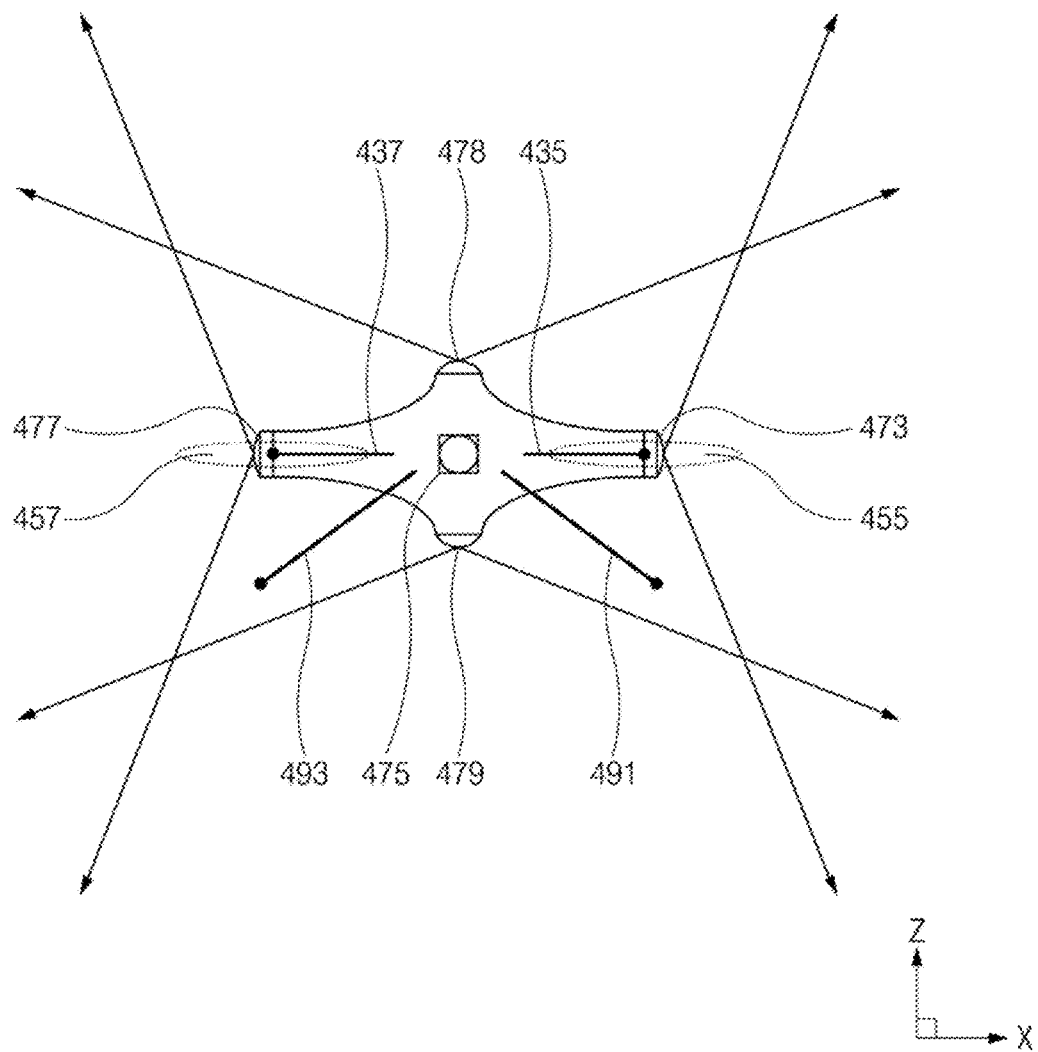
FIG. 4B illustrates an elevation view of a UAV having a second structure according to an embodiment of the present disclosure.

FIG. 4A illustrates a plane view of a UAV having a second structure according to an embodiment of the present disclosure. FIG. 4B illustrates an elevation view of a UAV having a second structure according to an embodiment of the present disclosure. In a description hereafter, the same or similar description to the above-mentioned description will be omitted.

Referring to FIGS. 4A and 4B, a UAV 400 may have four propellers. For example, the UAV 400 may include a first propellers 451 connected to a first propeller connecting part 431 extended from a left upper side of a body (or housing) 410, a second propellers 453 connected to a second propeller connecting part 433 extended from a right upper side of the body 410, a third propellers 455 connected to a third propeller connecting part 435 extended from a right lower side of the body 410, and a fourth propellers 457 connected to a fourth propeller connecting part 437 extended from a left lower side of the body 410. In this case, the body 410 of the UAV 400 may be substantially implemented in the form of a cross. For example, a first surface (e.g., a top surface) and a second surface (e.g., a bottom surface) of the body 410 may be substantially implemented in the form of the cross.

An omnidirectional sensor 220 of FIG. 2 may be disposed in a point where different sides of the body 410 meet and the top and bottom surfaces of the body 410. The omnidirectional sensor 220 may include first to sixth cameras 471, 473, 475, 477, 478, and 479. In the drawing shown, the first camera 471 may be disposed at an edge where the right upper side and the left upper side of the body 410 meet (e.g., an upper knob portion of the cross). The second camera 473 may be disposed at an edge where the right upper side and the right lower side of the body 410 meet (e.g., a right knob portion of the cross). The third camera 475 may be disposed at an edge where the right lower side and the left lower side of the body 410 meet (e.g., a lower knob portion of the cross). The fourth camera 477 may be disposed at an edge where the left lower side and the left upper side of the body 410 meet (e.g., a left knob portion of the cross). Further, the fifth camera 478 may be disposed at the top surface of the body 410, and the sixth camera 479 may be disposed at the bottom surface of the body 410.

According to an embodiment, an imaging angle of a camera disposed in a lateral direction of the body 410 may be set such that both propellers adjacent to the camera do not enter an image capture region. Further, a distance where the camera disposed in the lateral direction of the body 410 is spaced apart from a central point of the body 410 may be set to have a reduced non-image capture region which departs from an imaging angle.

According to an embodiment, an imaging angle of a camera disposed in a longitudinal direction of the body 410 may be set such that an image capture region of the camera disposed in the longitudinal direction and an image capture region of the camera disposed in the lateral direction of the body 410 are partially overlapped. Further, the imaging angle of the camera disposed in the longitudinal direction of the body 410 may be set to have a reduced non-image capture region which departs from the imaging angle.

According to an embodiment, at least one landing member may be disposed on the bottom surface of the body 410. The drawing shown illustrates a state where a first landing member 491 and a second landing member 493 are disposed on the bottom surface of the body 410. However, the number of landing members is not limited thereto. In some embodiments, at least one other member(s) may be further disposed on the bottom surface of the body 410.

Figure 4C:
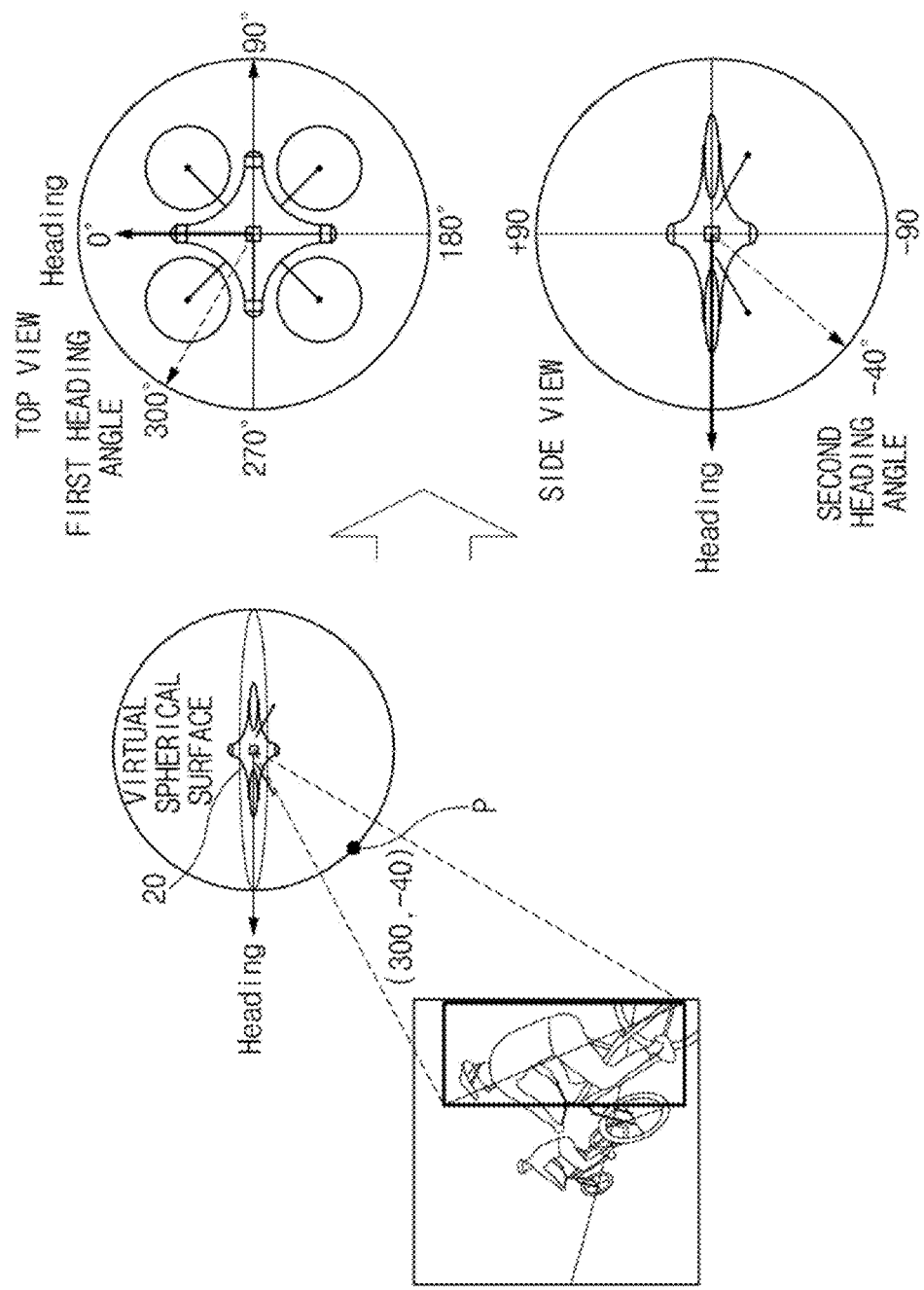
FIG. 4C illustrates a drawing of first and second heading angles of virtual coordinates according to an embodiment of the present disclosure.

FIG. 4C illustrates a drawing of first and second heading angles of virtual coordinates according to an embodiment of the present disclosure.

Referring to FIG. 4C, a UAV 20 may capture an image of a subject while slantly looking down a subject.

Referring to a top view of the UAV 20, since a first heading angle of the subject is a value obtained by horizontally measuring an angle between a heading of the UAV 20 and one feature point P of the subject in a clockwise direction, it may be, for example, 300 degrees.

Referring to a side view of the UAV 20, since the angle between the heading of the UAV 20 and the one feature point P of the subject is a vertical heading angle, a second heading angle of the subject may be −40 degrees. The second heading angle may have a plus (+) value with respect to an up direction of the UAV 20 and may have a minus (−) value with respect to a down direction of the UAV 20.

Figure 5:
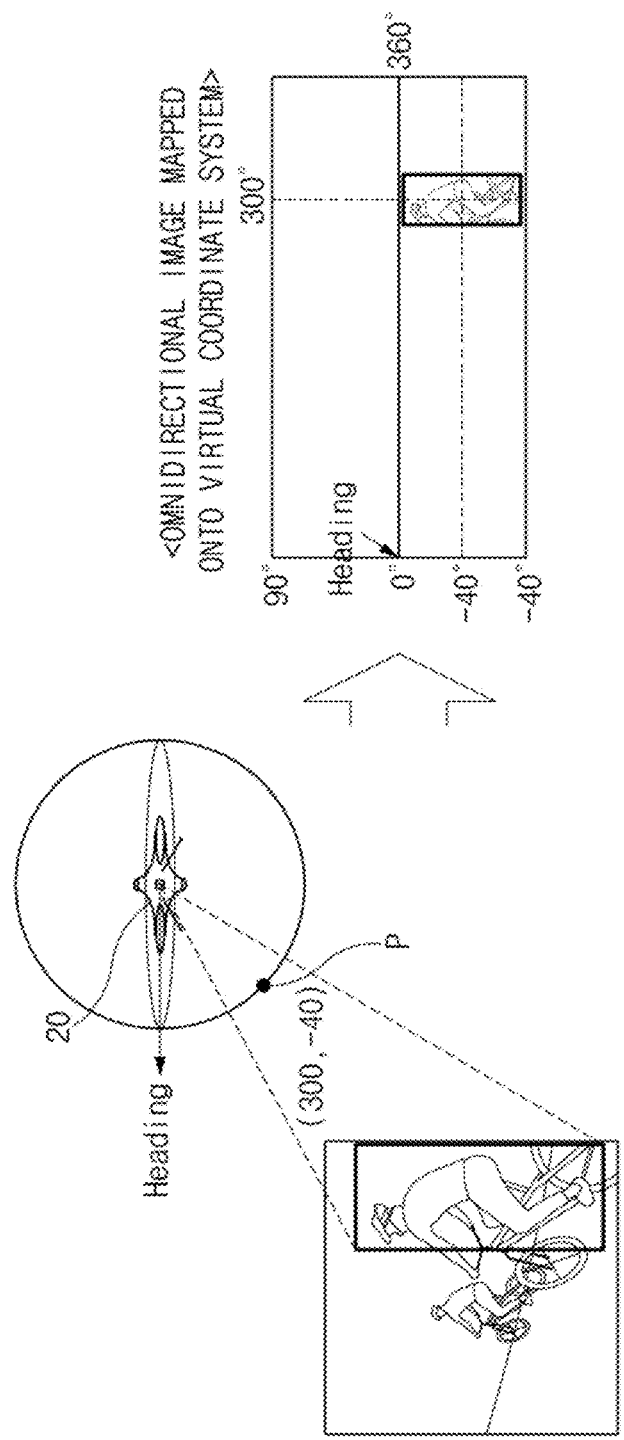
FIG. 5 illustrates a drawing of an omnidirectional image mapped onto a virtual coordinate system according to an embodiment of the present disclosure.

FIG. 5 illustrates a drawing of an omnidirectional image mapped onto a virtual coordinate system according to an embodiment of the present disclosure. In FIG. 5, an x-axis of a virtual coordinate system may be the entire range (0 degree to 360 degrees) of a first heading angle, and a y-axis of the virtual coordinate system may be the entire range (+90 degrees to −90 degrees) of a second heading angle. An origin point 0 of the virtual coordinate system may be a heading of a UAV 20.

Referring to FIG. 5, when an azimuth of a subject is (300, −40), the UAV 20 may generate an omnidirectional image such that an image of a subject is included in a location of the azimuth (300, −40). For example, the center of the subject is located on a location of the azimuth (300, −40) of the omnidirectional image, and a subject image corresponding to a size of the subject may be included relative to the azimuth (300, −40).

An omnidirectional image mapped onto the virtual coordinate system of FIG. 5 may be output as a UI screen for setting a tracking region. According to an embodiment, when receiving an omnidirectional image, mapping information between the omnidirectional image and a virtual coordinate system, and subject information, a remote control device 30 of FIG. 1 may output the omnidirectional image mapped onto the virtual coordinate system or a UI screen for setting a tracking region, including the omnidirectional image.

Figure 6A:
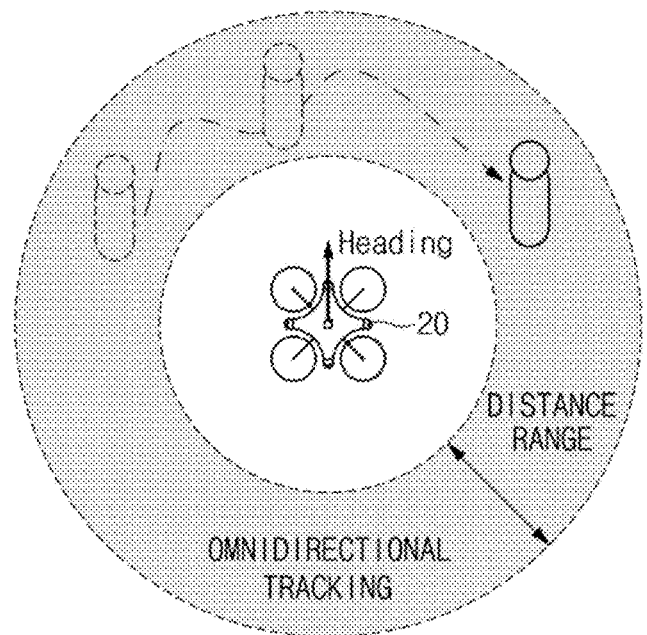
FIGS. 6A and 6B illustrate drawings of an omnidirectional tracking control method according to an embodiment of the present disclosure.
Figure 6B:
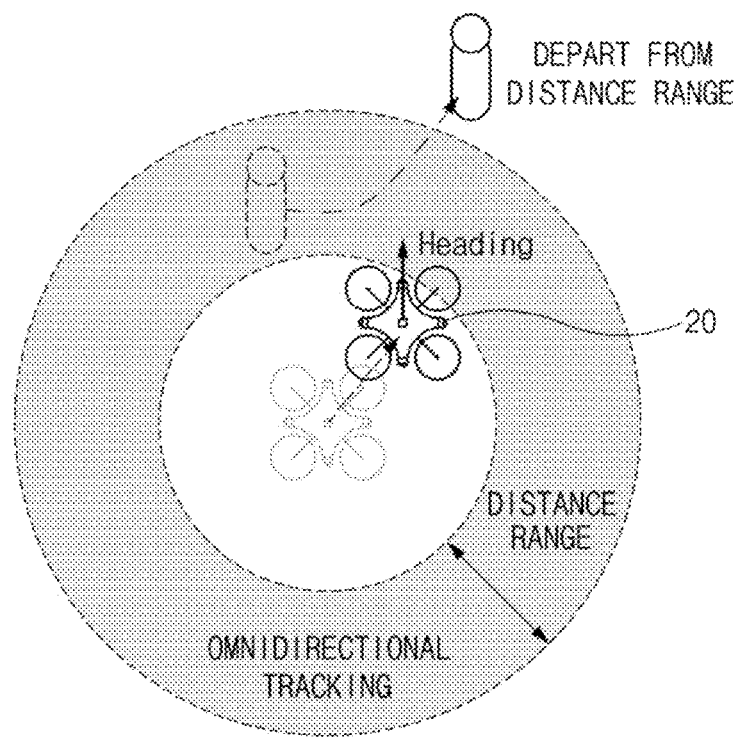

FIGS. 6A and 6B illustrates drawings of an omnidirectional tracking control method according to an embodiment of the present disclosure. FIGS. 6A and 6B illustrate to look down a UAV 20 and a subject.

Referring to FIG. 6A, when a specified heading angle range includes all orientations (a 360-degree direction), the UAV 20 may verify whether a distance of a subject belongs to a specified range and may determine a movement direction based on the verified result. For example, although the subject is moved, when the distance of the subject belongs to the specified range, the UAV 20 may fly (or hover) to reduce its movement.

Referring to FIG. 6B, when the distance of the subject does not belong to the specified range, the UAV 20 may move in a straight line in a direction corresponding to a first heading angle of the subject such that the distance of the subject belongs to the specified range. In this process, the UAV 20 may predict a next location of the subject based on at least one of a change in azimuth of the subject and a change in distance of the subject and may fly (e.g., move in a straight line) in response to an angle of the predicted location.

Figure 6C:
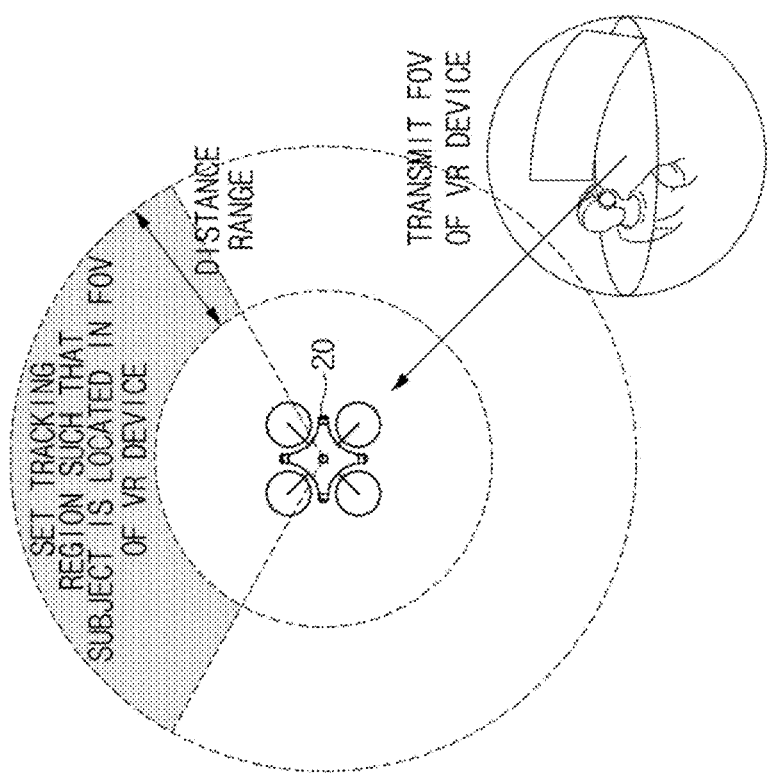
FIG. 6C illustrates a drawing of a tracking control method when a tracking region is set to a field of view (FOV) region of a wearable device (a VR device) according to an embodiment of the present disclosure.

FIG. 6C illustrates a drawing of a tracking control method when a tracking region is set to a field of view (FOV) region of a wearable device according to an embodiment of the present disclosure. The wearable device may include a device which supports virtual reality (VR), augmented reality (AR), mixed reality, or the like.

Referring to FIG. 6C, when verifying that a range of a first heading angle is limited from tracking region information or the like, the UAV 20 may control at least one of movement or yawing of the UAV 20 such that a subject is located within the limited range of the first heading angle. In this case, the limited range of the first heading angle may be set based at least in part on an FOV range of a wearable device. In addition, the UAV 20 may control its flight such that the first heading angle of the subject is within a limited range of a specified first heading angle and such that a distance of the subject is within a specified range and may track the subject.

Figure 6D:
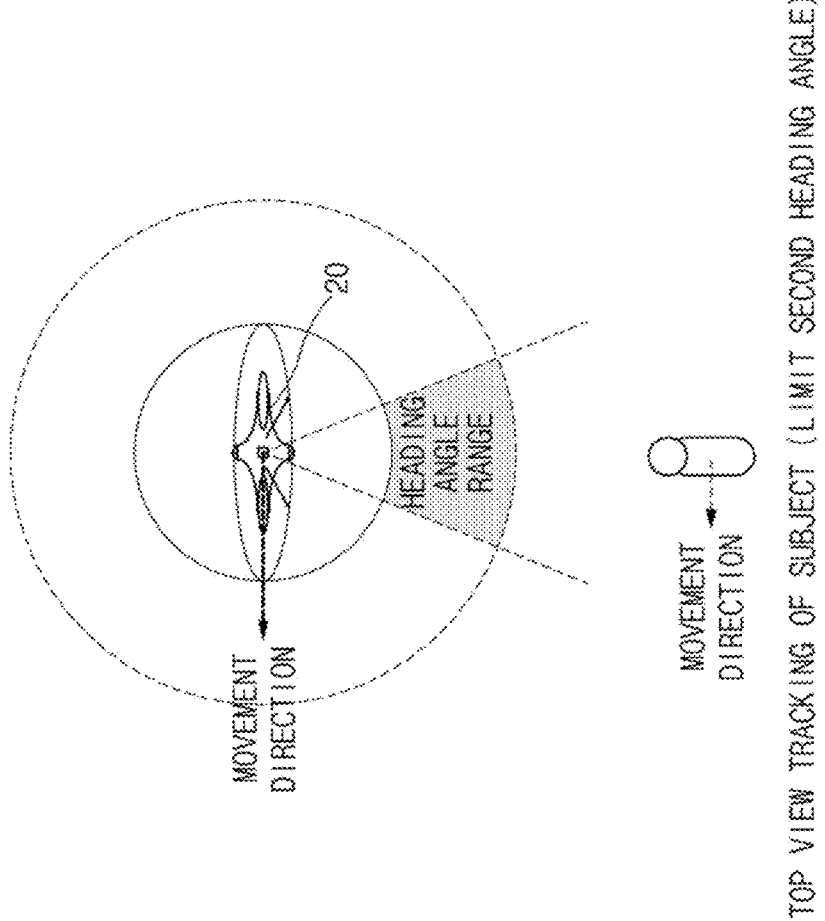
FIG. 6D illustrates a drawing of a tracking control method when a tracking region is set to a top view region according to an embodiment of the present disclosure.

FIG. 6D illustrates a drawing of a tracking control method when a tracking region is set to a top view region according to an embodiment of the present disclosure.

Referring to FIG. 6D, when verifying that a range of a second heading angle is limited from tracking region information, a UAV 20 may control at least one of its movement or its yawing such that a subject is located within the limited range of the second heading angle. The limited range of the second heading angle may be a range where an omnidirectional image of a form of looking down the subject is able to be generated. The limited range of the second heading angle may be, for example, −80 degrees to −90 degrees (a top view region). In addition, while the UAV 20 controls its flight such that a distance of the subject is located within a specified range in the limited range of the second heading angle, it may track the subject. When the subject moves, the UAV 20 may track the subject such that the subject is within the limited range of the second heading angle and within a specified distance range by moving in a movement direction of the subject.

Figure 6E:
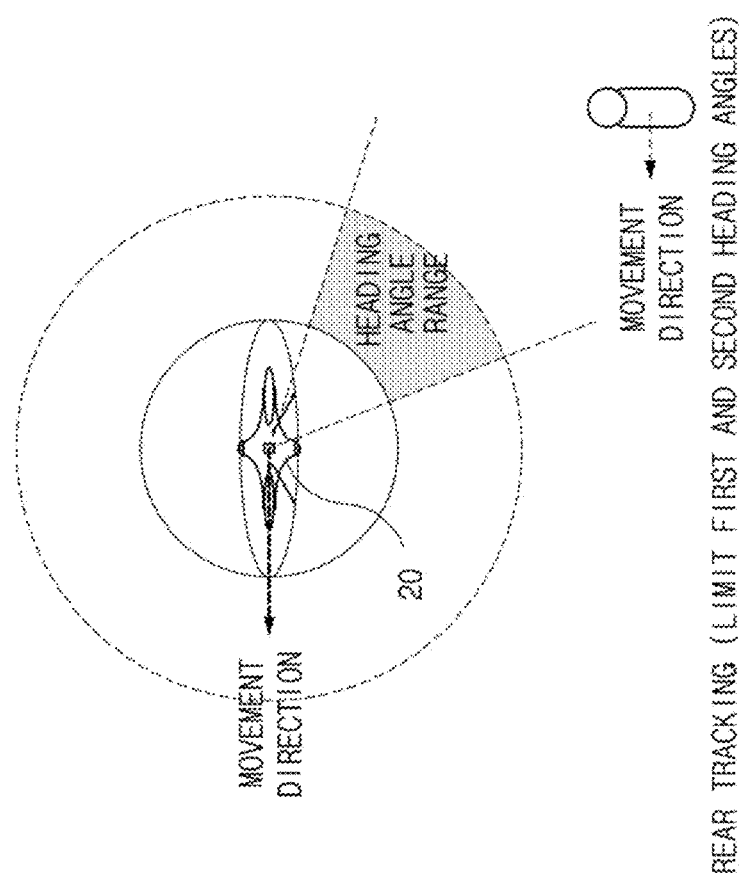
FIG. 6E illustrates a drawing of a tracking control method when a tracking region is set to a rear lower portion of a UAV according to an embodiment of the present disclosure.

FIG. 6E illustrates a drawing of a tracking control method when a tracking region is set to a rear lower portion of a UAV according to an embodiment of the present disclosure. FIG. 6E illustrates a UAV 20 and a subject in the form of looking at the UAV 20 and the subject from one side to another side.

Referring to FIG. 6E, a limited range of each of a first heading angle and a second heading angle may be a range where an omnidirectional image of a form of slantly looking down a subject is able to be generated. For example, the limited range of the first heading angle may be set to include at least a portion of a rear portion of the UAV 20. For another example, the limited range of the second heading angle may be the range of, for example, −80 degrees to −30 degrees. When the subject moves, the UAV 20 may track the subject such that the first and second heading angles of the subject belong to a specified heading angle range and such that a distance of the subject belongs to a specified distance range, by moving in a straight line at an angle corresponding to a next location corresponding to a movement direction of the subject.

Figure 7:
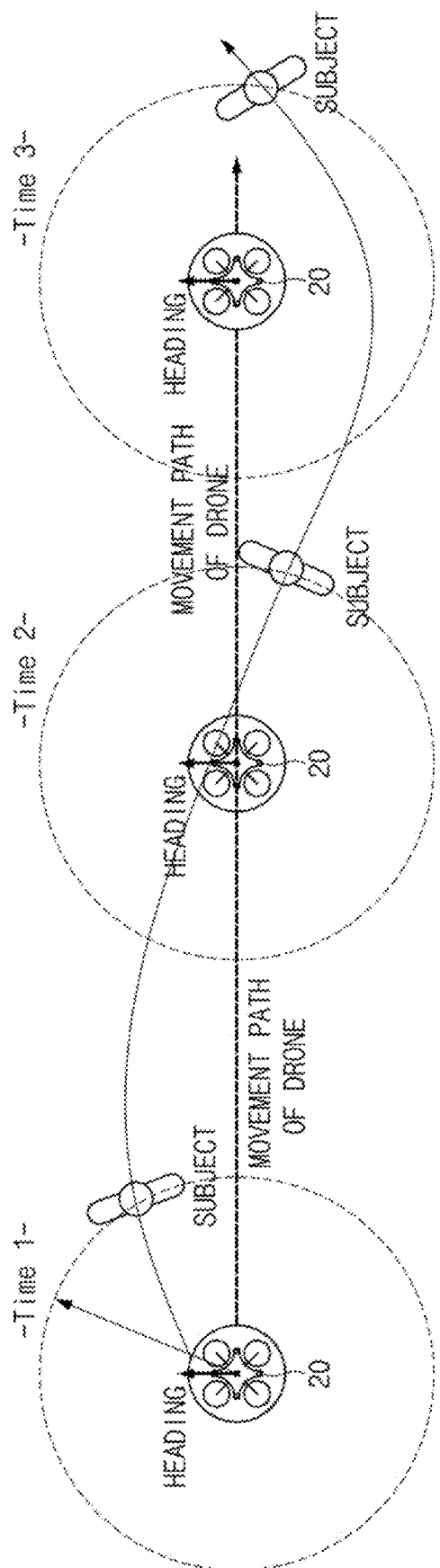
FIG. 7 illustrates a drawing of a subject tracking control method when a distance between a subject and a UAV is within a specified range although the subject is moved, according to an embodiment of the present disclosure.

FIG. 7 illustrates a drawing of a subject tracking control method when a distance between a subject and a UAV is within a specified range although the subject is moved, according to an embodiment of the present disclosure. In FIG. 7, a dotted circle (radius R) may be a specified distance range.

Referring to FIG. 7, a subject may rotate around a UAV 20 while maintaining a constant distance from the UAV 20. For example, while the subject keeps a distance from the UAV 20 constant, a first heading angle of the subject is approximately 50 degrees at time 1, the first heading angle of the subject is approximately 120 degrees at time 2, and the first heading angle of the subject is approximately 110 degrees at time 3. In this case, since a distance of the subject belongs to a specified range, the UAV 20 may hover while reducing yawing and movement.

The UAV 20 according to an embodiment may reduce the number of times of yawing to enhance quality of an image of a globular shape generated by a capture image and may enhance flight efficiency to reduce power consumption.

Figure 8:
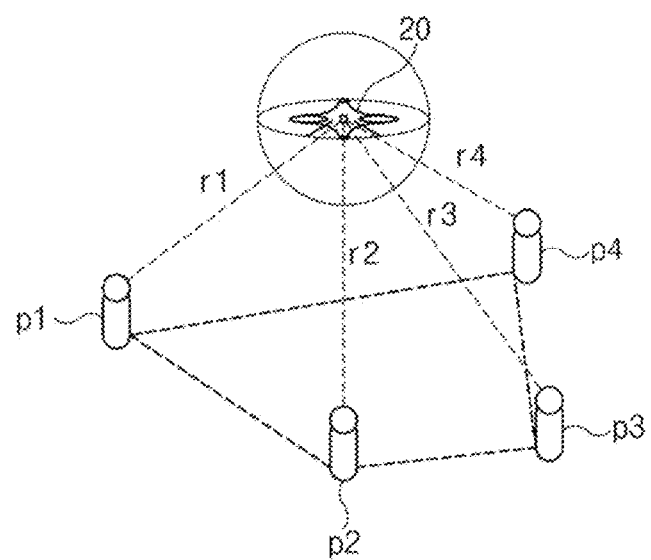
FIG. 8 illustrates a drawing of an example in which a UAV captures a plurality of subjects, according to various embodiments of the present disclosure.

FIG. 8 illustrates drawing of an example in which a UAV captures a plurality of subjects, according to various embodiments of the present disclosure.

According to an embodiment, while tracking a plurality of subjects, a UAV 20 may capture image of the plurality of subjects using a plurality of cameras. The plurality of subjects may be located close to each other, but, as shown in FIG. 8, subjects p1 to p4 may be spaced apart from each other. For example, when performing omnidirectional tracking, the UAV 20 may calculate a distance between each of the plurality of subjects and the UAV 20 and may generate its adjustment signal such that the plurality of calculated distances belong to a specified distance range. For another example, when tracking each of some orientations, the UAV 20 may generate various omnidirectional images depending on a specified heading angle range.

Figure 9:
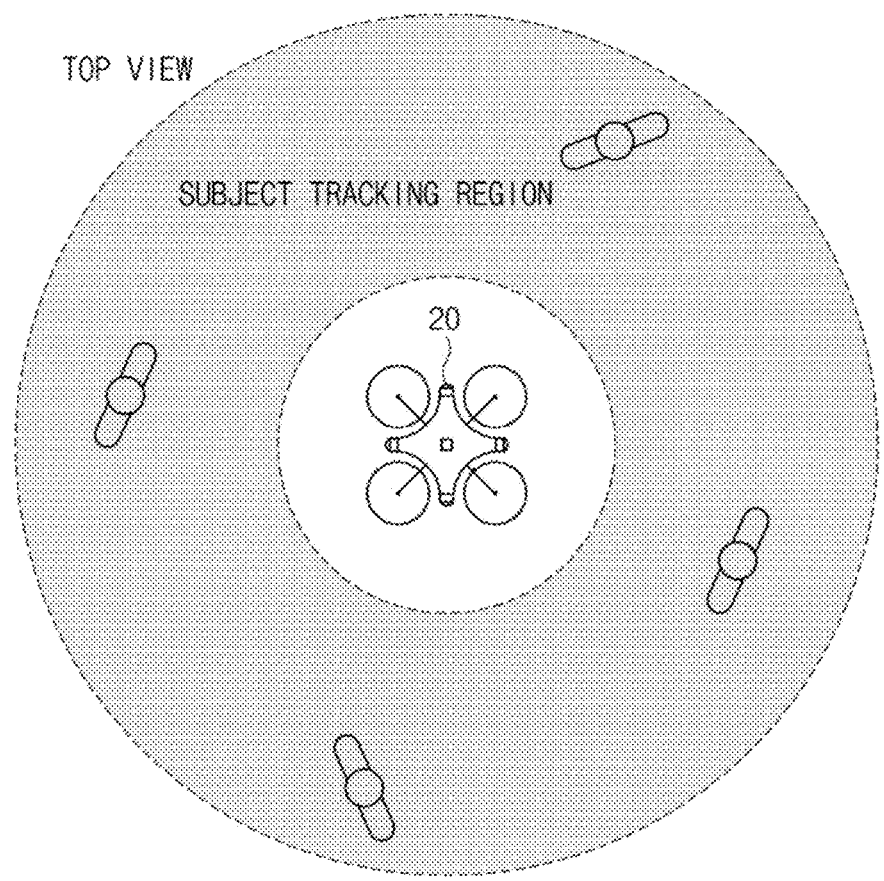
FIG. 9 illustrates a drawing of a method for controlling tracking of a plurality of subjects when a tracking region is set to an omnidirectional region, according to an embodiment of the present disclosure.

FIG. 9 illustrates a drawing of a method for controlling tracking of a plurality of subjects when a tracking region is set to an omnidirectional region, according to an embodiment of the present disclosure.

Referring to FIG. 9, when a tracking region is designated as an omnidirectional region, a UAV 20 may generate its adjustment signal such that a distance between the UAV 20 and each of a plurality of subjects is within a specified distance range. For example, the UAV 20 may move at an angle corresponding to a location where a calculated distance deviation between the UAV 20 and the subjects is able to be reduced to a lower value.

Figure 10:
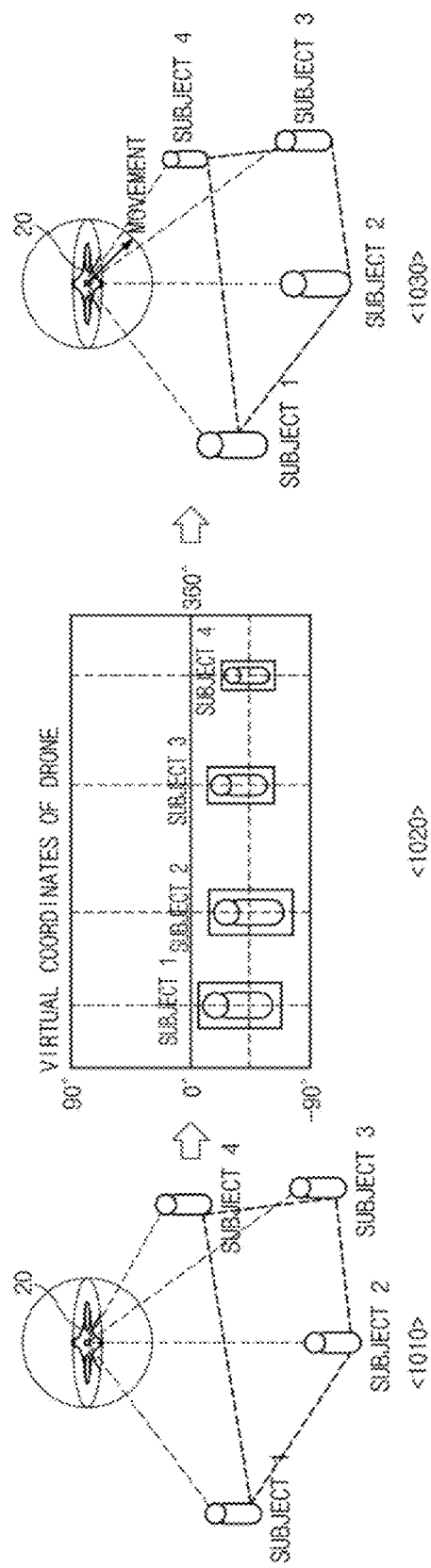
FIG. 10 illustrates a drawing of an omnidirectional image corresponding to a first location of a plurality of subjects according to an embodiment of the present disclosure.

FIG. 10 illustrates a drawing of an omnidirectional image corresponding to a first location of a plurality of subjects according to an embodiment of the present disclosure.

Referring to FIG. 10, tracking targets may be a plurality of subjects (e.g., subjects 1 to 4) located in the form of reference numeral 1010 with respect to a UAV 20.

According to an embodiment, the UAV 20 may calculate first and second heading angles of each of the plurality of subjects and may generate an omnidirectional image 1020 where each of the plurality of subjects is located at the calculated first and second heading angles. Pixels of the omnidirectional image 1020 may be mapped onto a virtual coordinate system. When subjects are almost similar in size to each other, sizes of the subjects may be proportional to distances of the subjects. In this case, the UAV 20 may generate its adjustment signal such that an average size of the subjects is kept constant to some degree in the omnidirectional image. For example, since each of subjects 3 and 4 is smaller in size than each of subjects 1 and 2 in an omnidirectional image (e.g., the omnidirectional image 1020 of FIG. 10), like reference numeral 1030, the UAV 20 may generate its adjustment signal to move at an angle of a direction close to subjects 3 and 4.

Figure 11:
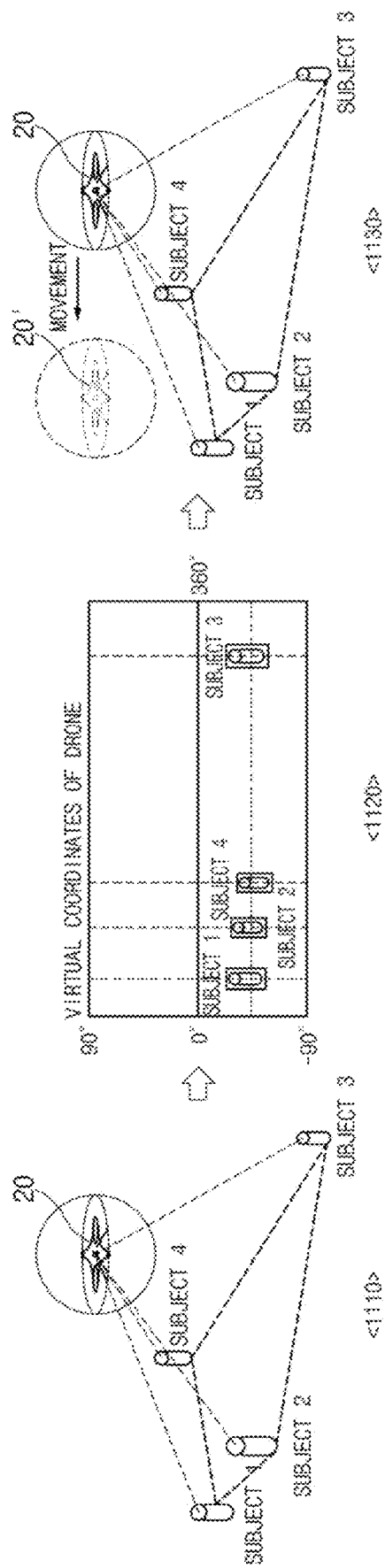
FIG. 11 illustrates a drawing of an omnidirectional image corresponding to a second location of a plurality of subjects according to an embodiment of the present disclosure.

FIG. 11 illustrates a drawing of an omnidirectional image corresponding to a second location of a plurality of subjects according to an embodiment of the present disclosure.

Referring to FIG. 11, a UAV 20 may fly on a second location capable of reducing a deviation between distances of a plurality of subjects when tracking the plurality of subjects. Like reference numeral 1110 of FIG. 11, at least one (e.g., subject 3) of the plurality of subjects may be relatively more spaced apart from the UAV 20 than the other subjects. In this case, each of subjects included in an omnidirectional image 1120 captured in the second location capable of reducing a deviation between distances of subjects 1 to 4 may become excessively small in size. To prevent this, the UAV 20 may select at least some of the plurality of subjects and may track the selected subjects. For example, the UAV 20 may select subject 1, subject 2, and subject 4 in an order where distances between the UAV 20 and the subjects are near and may not track subject 3 any longer. Like reference numeral 1130 of FIG. 11, the UAV 20 may move at an angle corresponding to a location capable of reducing a deviation between distances from subjects 1, 2, and 4 and may be located (e.g., on a location of a UAV 20) between subjects 1, 2, and 4.

Figure 12:
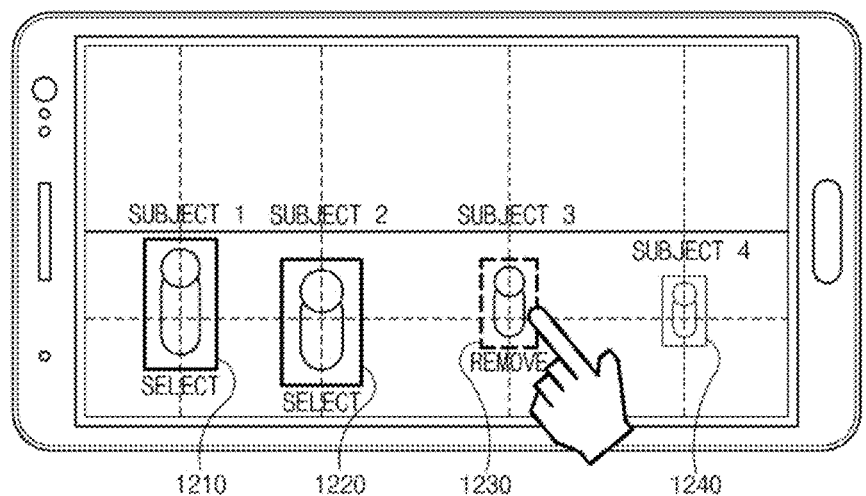
FIG. 12 illustrates a drawing of a user interface (UI) screen for setting a tracking target among a plurality of subjects according to an embodiment of the present disclosure.

FIG. 12 illustrates a drawing of a UI screen for setting a tracking target among a plurality of subjects according to an embodiment of the present disclosure.

According to an embodiment, a UAV 20 of FIG. 1 may transmit information for setting a tracking region, including an omnidirectional image, virtual coordinates, and subject information, at least once after initialization. For example, when at least one omnidirectional image is generated, the UAV 20 may periodically transmit information for setting a tracking region. For another example, when an average of distances between the UAV 20 and a plurality of subjects departs from a specified range, the UAV 20 may transmit information for setting a tracking region.

According to an embodiment, when receiving information for setting a tracking region, including an omnidirectional image, virtual coordinates, and subject information, as shown in FIG. 12, a remote control device 30 of FIG. 1 may display the omnidirectional image mapped onto a virtual coordinate system. For example, the remote control device 30 may output an omnidirectional image including subjects 1 to 4 (e.g., regions 1210 to 1240 where subjects 1 to 4 are displayed).

According to an embodiment, the remote control device 30 may provide a UI screen for selecting a target to be tracked and a target not to be tracked among a plurality of subjects. For example, when a region where a subject is displayed is touched, the remote control device 30 may output a menu for setting to select or remove the subject and may determine a tracking target based on a user input through the output menu. The remote control device 30 may transmit information about the determined tracking target to the UAV 20. The UAV 20 may track one or more subjects based at least in part on the received tracking target information.

For example, the remote control device 30 may determine (e.g., select in FIG. 12) subjects 1 and 2 as tracking targets and may determine (e.g., remove in FIG. 12) subject 3 as a target not to be tracked, through a touch of each of the regions 1210, 1220, and 1230 where subjects 1 to 3 are displayed. In this case, the UAV 20 may verify that subjects 1 and 2 are tracking targets from tracking target information and may tract subjects 1 and 2.

Figure 13:
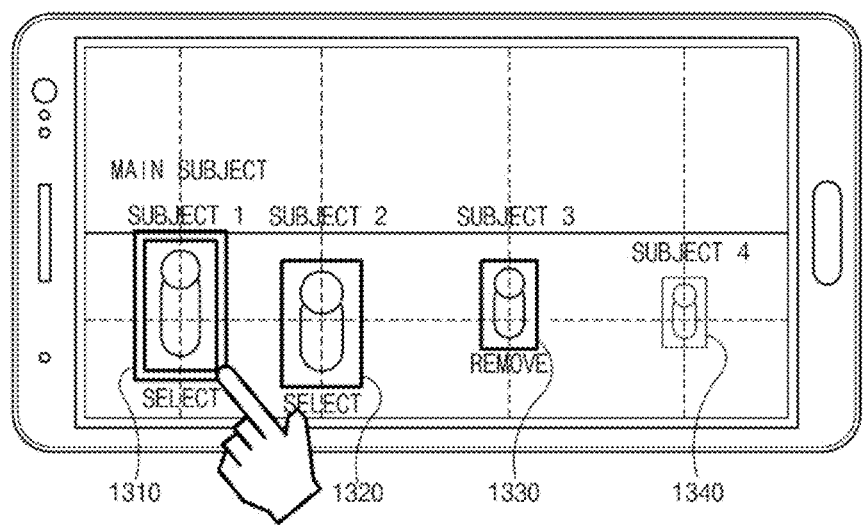
FIG. 13 illustrates a drawing of a UI screen for setting priorities of a plurality of subjects according to an embodiment of the present disclosure.

FIG. 13 illustrates a drawing of a UI screen for setting priorities of a plurality of subjects according to an embodiment of the present disclosure.

According to an embodiment, when tracking targets are set to a plurality of subjects, a remote control device 30 of FIG. 1 may provide a menu for setting priorities for at least some of the plurality of subjects. For example, like reference numeral 1310 of FIG. 13, the priority may be set for only a main subject among the plurality of subjects. For another example, the priority may be set for each of the plurality of subjects. When the priorities of the plurality of subjects are set, the remote control device 30 may transmit subject information including information about the priorities of the subjects.

According to an embodiment, when at least some of the plurality of subjects depart from a tracking region, a UAV 20 of FIG. 1 may select a subject to be tracked based on the priority and may track the selected subject based on a distance of the selection subject and a heading angle of the selected subject.

As shown in FIG. 13, subjects 1 and 2 (e.g., regions 1310 and 1320 where subjects 1 and 2 are displayed) may be set (e.g., selected in FIG. 13) to tracking targets among subjects 1 to 4 through the remote control device 30, a priority of subject 1 between the subjects 1 and 2 may be set to a first priority (a main subject of FIG. 13). In this case, the UAV 20 may receive tracking target information from the remote control device 30 and may first track subject 1. For example, as a distance between subjects 1 and 2 is away from each other, when at least one of a distance between the UAV 20 and subject 1 and a distance between the UAV 20 and subject 2 departs from a specified distance range, the UAV 20 may track subject 1 and may fail to track subject 2.

Figure 14:
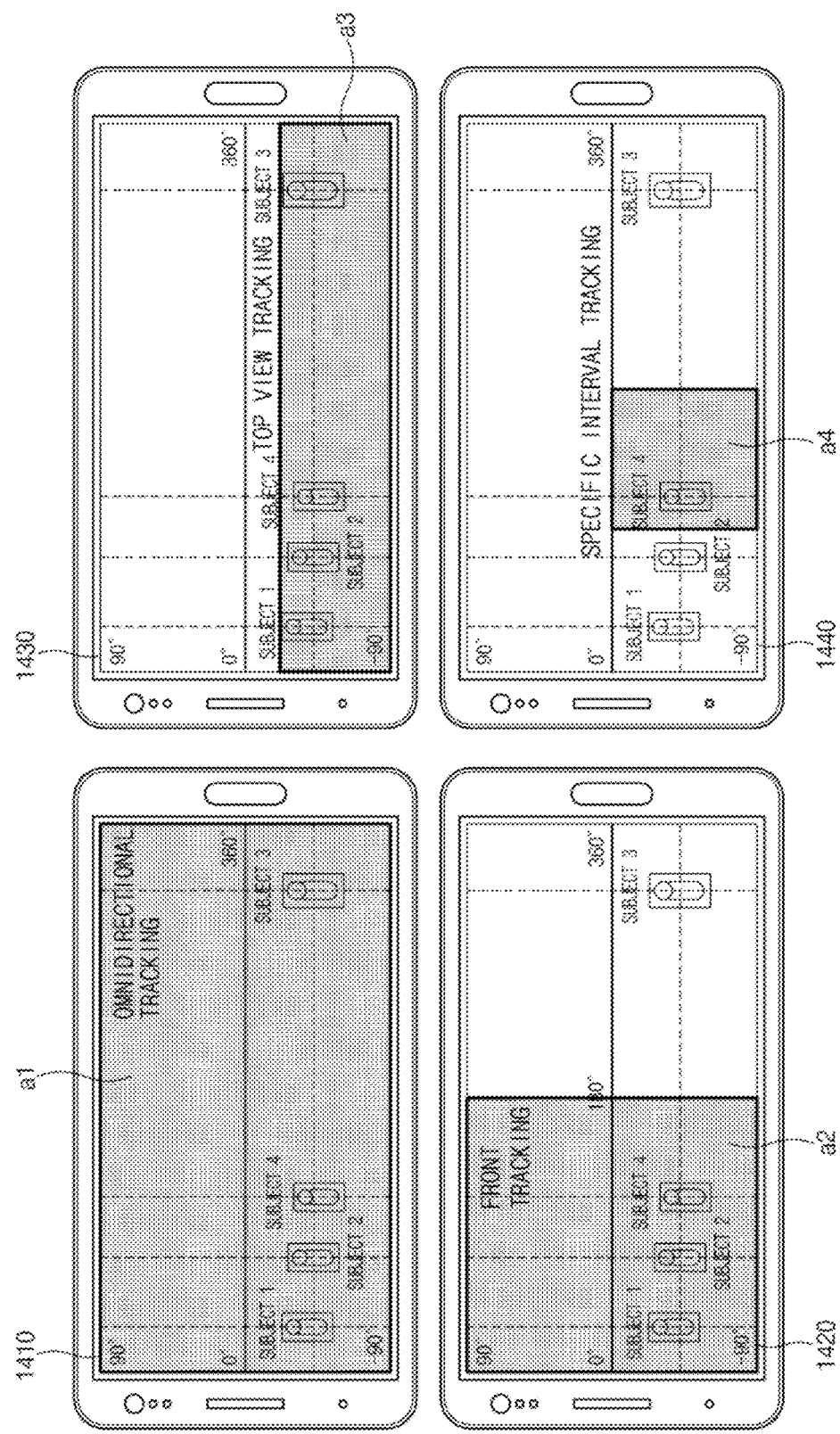
FIG. 14 illustrates a drawing of a UI screen for setting a tracking region according to various embodiments of the present disclosure.

FIG. 14 illustrates a drawing of a UI screen for setting a tracking region according to an embodiment of the present disclosure.

According to an embodiment, when receiving information for setting a tracking region, a remote control device 30 of FIG. 1 may display an omnidirectional image mapped onto a virtual coordinate system. The remote control device 30 may provide a UI for setting a tracking region. The tracking region may include, for example, an omnidirectional region, a top view region, a front region, a rear region, a specific region, or the like.

In an embodiment, the remote control device 30 may provide a UI for dragging and designating at least a partial region on the displayed omnidirectional image and may determine the dragged region as a tracking region (a heading angle range). In an embodiment, the remote control device 30 may output a menu including a plurality of designatable tracking regions and may determine a tracking region selected on the output menu.

Like screen 1410, the tracking region may be set to an omnidirectional region a1. The omnidirectional region a1 may include the entire interval (0 degree to 360 degrees) of a first heading angle and the entire interval (−90 degrees to +90 degrees) of a second heading angle. When the tracking region is set to the omnidirectional region a1, the remote control device 30 may transmit tracking region information indicating that the tracking region is the omnidirectional region a1. Receiving the tracking region information, a UAV 20 of FIG. 1 may verify that the tracking region is the omnidirectional region a1 and may generate its adjustment signal such that a subject is located within a specified distance range in the omnidirectional region a1.

Like screen 1420, the tracking region may be set to a front region a2. The front region a2 may include an interval (0 degree to 180 degrees) of the first heading angle and the entire interval (−90 degrees to +90 degrees) of the second heading angle. When the tracking region is set to the front region a2, the remote control device 30 may transmit tracking region information indicating that the tracking region is the front region a2. Receiving the tracking region information, the UAV 20 may verify that the tracking region is the front region a2 and may generate its adjustment signal such that the subject is located within the front region a2.

Like screen 1430, the tracking region may be set to a top view region a3. The top view region a3 may include the entire interval (0 degree to 360 degrees) of the first heading angle and an interval (90 degrees to −20 degrees) of the second heading angle. When the tracking region is set to the top view region a3, the remote control device 30 may transmit tracking region information indicating that the tracking region is the top view region a3. Receiving the tracking region information, the UAV 20 may verify that the tracking region is the top view region a3 and may generate its adjustment signal such that the subject is located within the top view region a3.

Like screen 1440, the tracking region may be set to a specific region a4. The specific region a4 may be any specified orientation interval. In screen 1440, an embodiment is exemplified as the specific region a4 includes an interval (approximately 45 degree to 180 degrees) of the first heading angle and an interval (5 degrees to −90 degrees) of the second heading angle. When the tracking region is set to the specific region a4, the remote control device 30 may transmit tracking region information indicating a heading angel range of the tracking region. Receiving the tracking region information, the UAV 20 may verify the heading angle range and may generate its adjustment signal such that the subject is located within the heading angle range.

Figure 15:
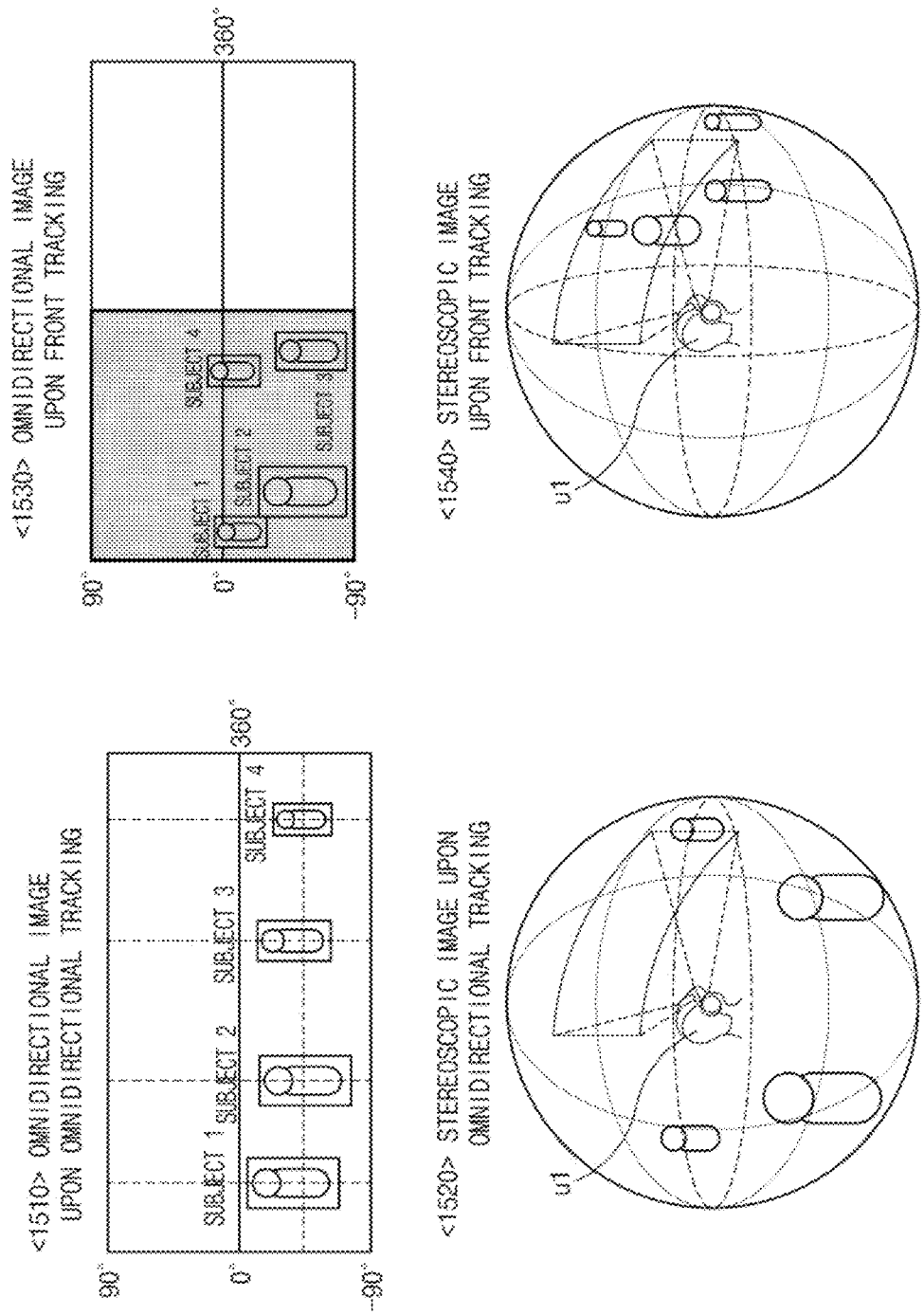
FIG. 15 illustrates a drawing of an example of comparing an omnidirectional image with a stereoscopic image, the omnidirectional image and the stereoscopic image corresponding to an omnidirectional region and a hemispherical region, according to an embodiment of the present disclosure.

FIG. 15 illustrates a drawing of an example of comparing an omnidirectional image with a stereoscopic image, the omnidirectional image and the stereoscopic image corresponding to an omnidirectional region and a hemispherical region, according to an embodiment of the present disclosure. In FIG. 15, a description will be given of an omnidirectional image according to a set tracking region, a flight location of a UAV, and a stereoscopic image, according to an embodiment.

Like reference numeral 1510 of FIG. 15, when a tracking region is set to an omnidirectional region, a UAV 20 of FIG. 1 may fly on a location between a plurality of subjects and may capture images of the plurality of subjects. Thus, as shown in reference numeral 1520, a generated stereoscopic image (an image of a globular shape) may have a form where the plurality of subjects are not located on only an FOV region of a wearable device (e.g., a VR device) and are scattered relative to a user u1 of the wearable device.

On the other hand, like reference numeral 1530 of FIG. 15, when the tracking region is set to a front region, the UAV 20 may capture images of the plurality of subjects while flying such that the plurality of subjects are located on the front region of the UAV 20. Thus, as shown in reference numeral 1540, a generated stereoscopic image (an image of a globular shape) may have a form where the plurality of subjects are located on the FOV region of the wearable device or are located close to the FOV region.

According to an embodiment, an electronic device (e.g., the UAV 20 of FIG. 2) includes a sensor (e.g., the omnidirectional sensor 220 of FIG. 2) configured to sense at least one external object in the direction of 360 degrees outside the electronic device; an actuator (e.g., the movement control module 240 of FIG. 2) configured to allow the electronic device to move or yaw; and a processor (e.g., the processor 250 of FIG. 2), wherein the processor is configured to verify an angle corresponding to a location of the at least one external object among the 360 degrees and a distance between the at least one external object and the electronic device using the sensor; and when the distance does not belong to a specified range, move the electronic device in a direction corresponding to the angle using the actuator such that the distance belongs to the specified range.

According to an embodiment, the electronic device further includes a communication module (e.g., the communication module 210 of FIG. 2) configured to communicate with another electronic device, wherein the processor is configured to when receiving selection information about a partial heading angle range among the 360 degrees via the communication module, verify whether the angle belongs to the partial heading angle range; and when the angle does not belong to the partial heading angle range, move the electronic device such that the angle belongs to the partial heading angle range.

The processor is configured to when the angle belongs to the partial heading angle range and when the distance does not belong to a second specified range, move the electronic device in a direction corresponding to the angle such that the distance belongs to the second specified range.

Figure 18:
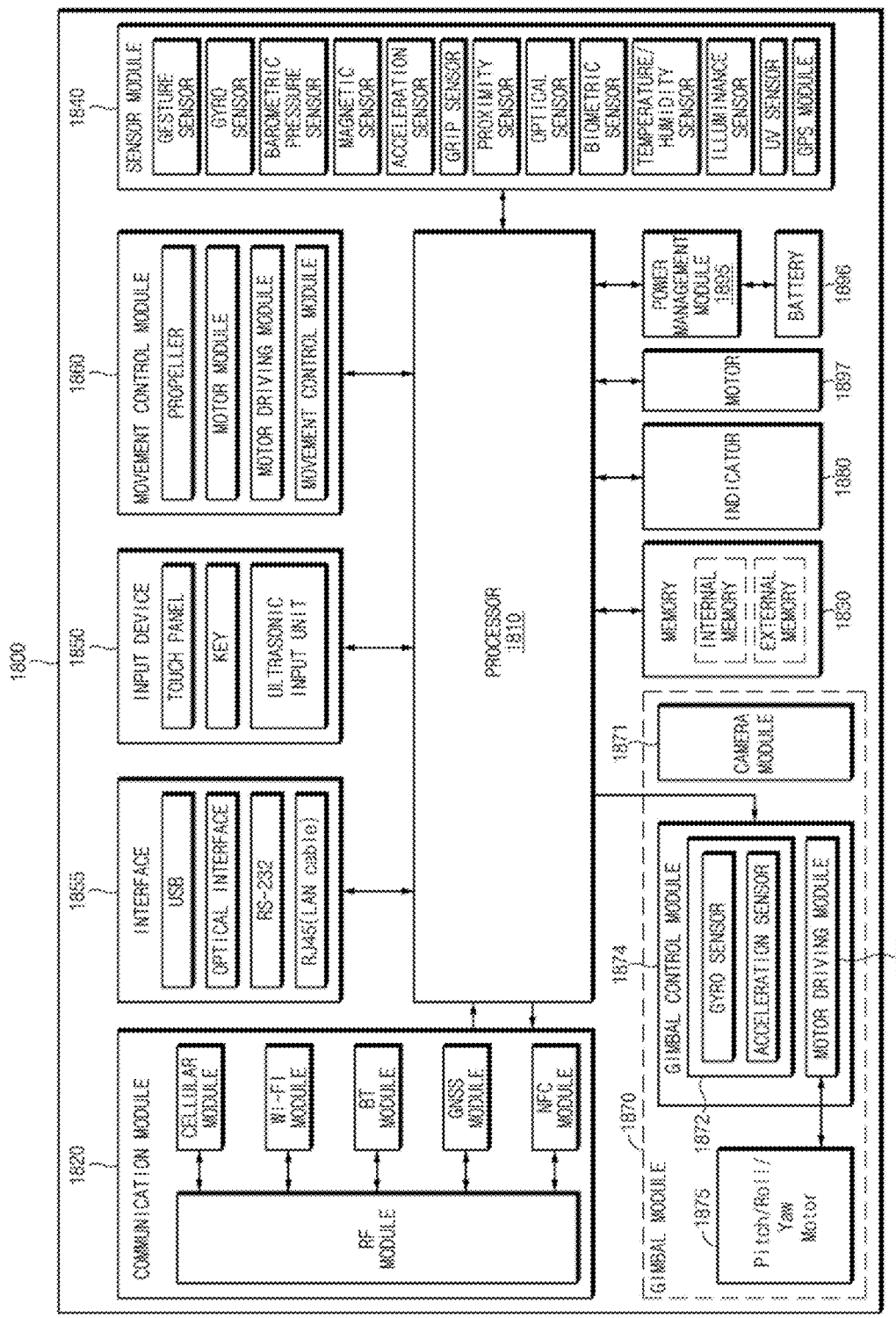
FIG. 18 illustrates a block diagram of a configuration of an electronic device for tracking a subject according to various embodiments of the present disclosure.

The electronic device further includes a global positioning system (GPS) module (e.g., the GPS module that is included in the sensor module 1840 of FIG. 18) and a communication module (e.g., the communication module 210 of FIG. 2), wherein the processor is configured to verify GPS coordinates of the electronic device using the GPS module; receive GPS coordinates of the at least one external object via the communication module; and verify the distance based at least in part on the GPS coordinates of the electronic device and the GPS coordinates of the at least one external object.

The sensor comprises one or more cameras configured to capture images for a 360-degree direction of a lateral direction or a longitudinal direction outside the electronic device, and wherein the processor is configured to verify the angle corresponding to the location of the at least one external object and the distance between the at least one external object and the electronic device based at least in part on the images captured by the one or more cameras.

The electronic device further includes a communication module configured to communicate with another electronic device, wherein the processor is configured to detect one or more external objects included in an omnidirectional image generated using the one or more cameras; transmit external object information, associated with the one or more detected external objects, including the omnidirectional image and the angle to the other electronic device via the communication module; receive object information associated with an external object selected by a user among the one or more detected external objects from the other electronic device; and detect the selected external object corresponding to the received object information using the sensor.

The processor is configured to when the selected external object is one external object, verify an angle corresponding to a location of the one external object and a distance between the one external object and the electronic device; and when the distance between the one external object and the electronic device does not belong to the specified range, move the electronic device in a direction corresponding to the angle such that the distance between the one external object and the electronic device belongs to the specified range.

The processor is configured to when the selected external object is a plurality of external objects, verify a plurality of angles corresponding to locations of the plurality of external objects and distances between the plurality of external objects and the electronic device; when at least one of the verified distances does not belong to a second specified range, calculate a location where each of the verified distances belongs to the second specified range; and move the electronic device in a direction corresponding to an angle of the calculated location.

The processor is configured to when it is impossible to calculate the location where each of the verified distances belongs to the second specified range, select at least one of the plurality of external objects; calculate a location where a distance between the at least one selected external object and the electronic device belongs to the second specified range; and move the electronic device in a direction corresponding to an angle of the calculated location.

The processor is configured to when the selected object is a plurality of external objects, verify a plurality of angles corresponding to locations of the plurality of external objects, distances between the plurality of external objects and the electronic device, and priorities of the plurality of external objects; calculate a second location where a distance between one or more external objects, the priorities of which are greater than or equal to a specified ranking, and the electronic device belongs to the second specified range; and move the electronic device in a direction corresponding to an angle of the second location.

The processor is configured to when the distance belongs to the specified range, control the electronic device to maintain a location of the electronic device.

According to an embodiment, an electronic device (e.g., the UAV 20 of FIG. 2) includes a housing (e.g., the body 410 of FIG. 4a); a plurality of cameras (e.g., the omnidirectional sensor 220 of FIG. 2) configured to be located in a plurality of regions of the housing and obtain a plurality of images for a plurality of directions; an actuator (e.g., the movement control module 240 of FIG. 2) configured to be located on at least one side of the housing and support at least one of hovering, movement, or yawing of the electronic device; a processor (e.g., the processor 250 of FIG. 2) configured to be electrically connected with the plurality of cameras and the actuator; and a memory (e.g., the memory 230 of FIG. 2) configured to be electrically connected with the processor, wherein the memory stores instructions configured to cause the processor to detect at least one external object located in at least one of a plurality of directions relative to one point of the housing using the plurality of cameras; verify an angle corresponding to a location where the at least one detected external object is located and a distance between the at least one external object and the electronic device; when the distance does not belong to a specified range, move the electronic device in a direction corresponding to the angle using the actuator such that the distance belongs to the specified range; and generate an omnidirectional image using the plurality of images obtained using the plurality of cameras.

The electronic device further includes a global positioning system (GPS) module (e.g., the GPS module that is included in the sensor module 1840 of FIG. 18) and a communication module (e.g., the communication module 210 of FIG. 2). The instructions are further configured to cause the processor to verify GPS coordinates of the electronic device using the GPS module; receive GPS coordinates of the at least one external object via the communication module; and verify the distance based on at least in part on the GPS coordinates of the electronic device and the GPS coordinates of the at least one external object.

The electronic device further includes a communication module (e.g., the communication module 210 of FIG. 2) configured to communicate with another electronic device, wherein the instructions are further configured to cause the processor to when receiving selection information about a partial heading angle range among 360 degrees via the communication module, verify whether the angle belongs to the partial heading angle range; and when the angle does not belong to the partial heading angle range, move the electronic device such that the angle belongs to the partial heading angle range.

The instructions are further configured to cause the processor to verify the partial heading angle range; when the angle belongs to the partial heading angle range and when the distance does not belong to a second specified range, move the electronic device in a direction corresponding to the angle such that the distance belongs to the second specified range.

The electronic device further includes a communication module (e.g., the communication module 210 of FIG. 2) configured to communicate with another electronic device, wherein the instructions are further configured to cause the processor to detect one or more external objects included in the omnidirectional image; transmit external object information, associated with the one or more detected external objects, including the omnidirectional image and the angle to the other electronic device via the communication module; receive object information associated with an external object selected by a user among the one or more detected external objects from the other electronic device; and detect the selected external object corresponding to the received object information using the plurality of cameras.

The instructions are further configured to cause the processor to when the selected external object is one external object, verify an angle corresponding to a location of the one external object and a distance between the one external object and the electronic device; and when the distance between the one external object and the electronic device does not belong to the specified range, move the electronic device in a direction corresponding to the angle such that the distance between the one external object and the electronic device belongs to the specified range.

The instructions are further configured to cause the processor to when the selected external object is a plurality of external objects, verify a plurality of angles corresponding to locations of the plurality of external objects and distances between the plurality of external objects and the electronic device; when at least one of the verified distances does not belong to a second specified range, calculate a location where each of the verified distances belongs to the second specified range; and move the electronic device in a direction corresponding to an angle of the calculated location.

The instructions are further configured to cause the processor to when the selected object is a plurality of external objects, verify a plurality of angles corresponding to locations of the plurality of external objects, distances between the plurality of external objects and the electronic device, and priorities of the plurality of external objects; calculate a second location where a distance between one or more external objects, the priorities of which are greater than or equal to a specified ranking, and the electronic device belongs to the second specified range; and move the electronic device in a direction corresponding to an angle of the second location.

The instructions are further configured to cause the processor to when the distance belongs to the specified range, control the electronic device to maintain a location of the electronic device.

Figure 16:
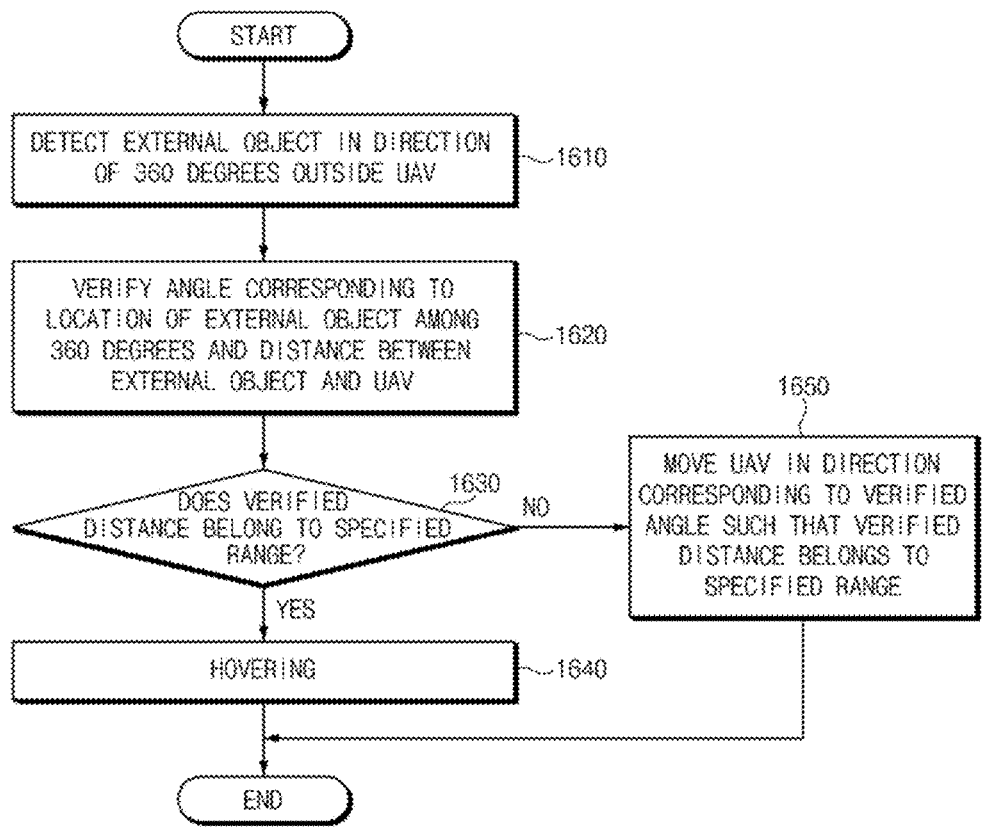
FIG. 16 illustrates a flowchart for an unmanned flight control method according to an embodiment of the present disclosure.

FIG. 16 illustrates a flowchart for an unmanned flight control method according to an embodiment of the present disclosure.

Referring to FIG. 16, in operation 1610, an electronic device (e.g., a UAV 20) may detect one or more external objects in the direction of 360 degrees outside the UAV 20.

In operation 1620, the UAV 20 may verify an angle corresponding to each of locations of the one or more detected external objects among 360 degrees and a distance between each of the one or more detected external objects and the UAV 20 using the detected information.

In operation 1630, the UAV 20 may verify whether the verified distance belongs to a specified range.

When the verified distance belongs to the specified range, in operation 1640, the UAV 20 may control its movement (e.g., its hovering) such that the verified distance (the distance between the UAV 20 and each of the one or more external objects) is changed within the specified range.

When the verified distance does not belong to the specified range, in operation 1650, the UAV 20 may move in a direction corresponding to the angle using its actuator such that the verified distance belongs to the specified range.

Figure 17:
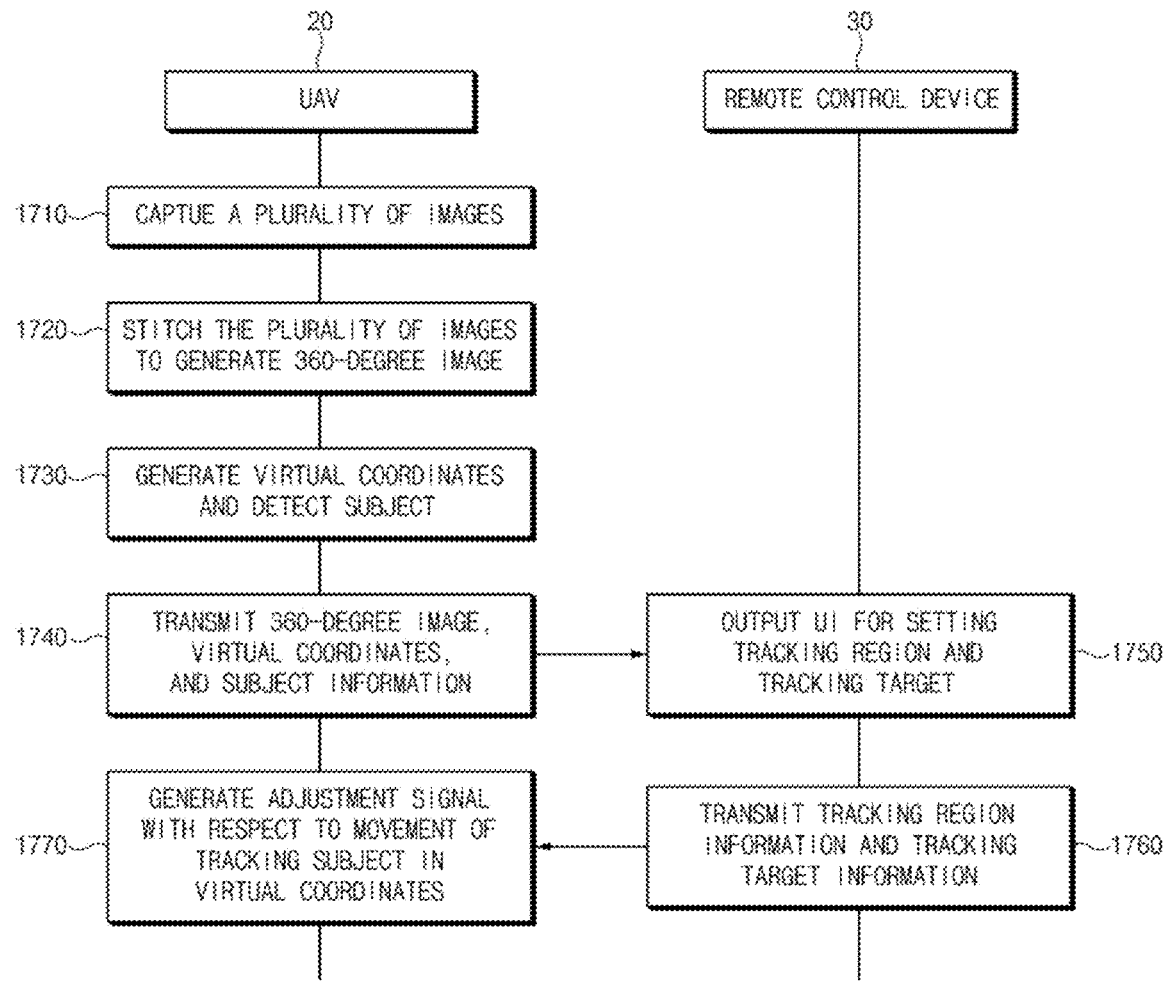
FIG. 17 illustrates a flowchart for an unmanned flight control method according to an embodiment of the present disclosure.

FIG. 17 illustrates a flowchart for an unmanned flight control method according to an embodiment of the present disclosure.

Referring to FIG. 17, in operation 1710, a UAV 20 may capture a plurality of images for different directions using a plurality of cameras.

In operation 1720, the UAV 20 may stitch the plurality of images to generate an omnidirectional image (a 360-degree image).

In operation 1730, the UAV 20 may generate virtual coordinates using the omnidirectional image and may detect a subject (an external object). The UAV 20 may generate subject information about the detected subject (e.g., a heading angle, a size, or the like of the subject).

In operation 1740, the UAV 20 may transmit the 360-degree image, information about a mapping relationship between the 360-degree image and a virtual coordinate system, and subject (external object) information to a remote control device 30.

In operation 1750, the remote control device 30 may output a UI for setting a tracking region and a tracking target. For example, the UAV 20 may output a 360-degree image mapped onto the virtual coordinate system. The UAV 20 may verify settings of the tracking region and the tracking target based on a specified region on the output UI screen. Tracking target information may include, for example, information indicating at least one of a heading angle of a subject to be tracked, a region of the subject, and a size of the subject. Tracking region information may include a heading angle rang to be tracked.

In operation 1760, when the tracking region and the tracking target are set, the remote control device 30 may transmit the tracking region information and the tracking target information (object information).

When receiving the tracking region information and the tracking target information, in operation 1770, the UAV 20 may generate its adjustment signal such that the tracking target belongs to a heading angle range and a distance range corresponding to the tracking region. According to an embodiment, a control method of an electronic device may include detecting at least one external object in the direction of 360 degrees outside the electronic device, verifying an angle corresponding to a location of the at least one external object among the 360 degrees and verifying a distance between the at least one external object and the electronic device, based on the detected information, verifying whether the verified distance belongs to a specified range, when the verified distance belongs to the specified range, performing hovering of the electronic device, and, when the verified distance does not belong to the specified range, moving the electronic device in a direction corresponding to the angle using an actuator of the electronic device such that the verified distance belongs the specified range.

According to an embodiment, the method may further include receiving selection information about a partial heading angle range among the 360 degrees, verifying whether the angle belongs to the partial heading angel range, and, when the angle does not belong to the partial heading angle range, moving the electronic device using the actuator.

According to an embodiment, the method may further include, when verifying that the angle belong to the partial heading angle, verifying whether the distance does not belong to a second specified range, and when the distance does not belong to the second specified range, moving the electronic device in a direction corresponding to the angle using the actuator such that the distance belongs to the second specified range.

The detecting may include capturing images in a 360-degree direction of a lateral direction and a longitudinal direction outside the electronic device. The verifying of the angle may include verifying an angle corresponding to a location of the external object based on the images captured in the 360-degree direction.

The verifying of the angle may include generating an omnidirectional image using the images captured in the 360-degree direction, detecting the external object included in the omnidirectional image, transmitting external object information including the omnidirectional image and the angle to another electronic device, receiving information about an object selected among the external objects from the other electronic device, and verifying a distance between the selected object corresponding to the selected object information and the electronic device and an angle corresponding to the selected object.

When the selected object is a plurality of external objects, the verifying of the angle may include verifying a plurality of angles corresponding to locations of the plurality of external objects and distances between the plurality of external objects and the electronic device. The moving may include, when at least one of the plurality of verified distances does not belong to a second specified range, calculating a location where the plurality of distances belong to the second specified range and where a deviation between the plurality of distances is able to be reduced and moving the electronic device in a straight line to move in the straight line in a direction corresponding to the calculated location.

The moving may include, when it is impossible to calculate the location where the plurality of distances belong to the second specified range and where the deviation between the plurality of distances is able to be reduced, calculating a second location capable of reducing the deviation between the plurality of distances, verifying distances between the plurality of external objects and the second location, selecting an external object where the distances between the plurality of external objects and the second location belong to the second specified range, calculating an angle of a third location capable of detecting the selected external object, and moving the electronic device in a direction corresponding to the angle of the third location.

The moving may include, when it is impossible to calculate the location where the plurality of distances belong to the second specified range and where the deviation between the plurality of distances is able to be reduced, verifying priorities of the plurality of external objects, calculating a second location where distances between a plurality of external object except for at least one external object with a relatively lower priority and the electronic device belong to the second specified range, and moving the electronic device in a direction corresponding to an angle of the second location.

The location of the external object may include a location capable of detecting a specified feature point from the external object.

FIG. 18 illustrates a block diagram of a configuration of an electronic device for tracking a subject according to various embodiments of the present disclosure. In FIG. 18, a UAV/drone may be described as an electronic device 1800.

The electronic device 1800 (e.g., a UAV 20 of FIG. 2) may include one or more processors 1810 (e.g., an application processor (AP)), a communication module 1820, an interface 1855, an input device 1850, a sensor module 1840, a memory 1830, an audio module (not shown), an indicator 1880, a power management module 1895, a battery 1896, a camera module 1871, and a movement control module 1860. The electronic device 1800 may further include a gimbal module 1870.

The processor 1810 (e.g., a processor 250 of FIG. 2) may drive, for example, an operating system (OS) or an application program to control a plurality of hardware or software elements connected to the processor 1810 and may process and compute a variety of data. The processor 1810 may drive the OS and the application program to generate a flight command of the electronic device 1800. For example, the processor 1810 may generate a movement command using data received from the camera module 1871 or the sensor module 1840 and the communication module 1820.

The processor 1810 may calculate a relative distance of an obtained subject to generate a movement command and may generate an altitude movement command of a UAV using vertical coordinates of the subject, thus generating a horizontal and azimuth command of the electronic device 1800 using horizontal coordinates of the subject.

The communication module 1820 (e.g., a communication module 210 of FIG. 2) may include, for example, a cellular module, a wireless fidelity (Wi-Fi) module, a Bluetooth (BT) module, a global navigation satellite system (GNSS) module, a near field communication (NFC) module, and a radio frequency (RF) module. The communication module 1820 according to various embodiments of the present disclosure may receive a control signal of the electronic device 1800 and may transmit state information and image data information of the electronic device 1800 to an external electronic device (e.g., a remote control device 30). The RF module may transmit and receive a communication signal (e.g., an RF signal). The RF module may include, for example, a transceiver, a power amplifier module (PAM), a frequency filter, a low noise amplifier (LNA), an antenna, or the like. The GNSS module may output location information, such as latitude, longitude, altitude, global positioning system (GPS) speed, and GPS heading during movement of the electronic device 1800. The location information may be measured an accurate time and distance through the GNSS module and calculate a location. The GNSS module may obtain an accurate time together with three-dimensional (3D) speed information as well as latitude, longitude, and altitude. The electronic device 1800 according to an embodiment may transmit information for verifying a real-time movement state of the electronic device 1800 to a remote control device (e.g., the remote control device 30) via the communication module 1820.

The interface 1855 may be a device for inputting and outputting data with another electronic device. The interface

1855 may transmit a command or data, input from another external device, to other element(s) of the electronic device 1800 using a universal serial bus (USB) or an optical interface, an RS-232, and an RJ45. Alternatively, the interface 1855 may output a command or data, received from the other element(s) of the electronic device 1800, to a user or another external device.

The input device 1850 may include, for example, a touch panel, a key, or an ultrasonic input unit. The touch panel may use at least one of, for example, capacitive, resistive, infrared, and ultrasonic methods. Also, the touch panel may include a control circuit. The key may include, for example, a physical button, an optical key, or a keypad. The ultrasonic input device may detect ultrasonic waves, generated from an input tool, through a microphone and may verify data corresponding to the detected ultrasonic waves. A control input of the electronic device 1800 may be received through the input device 1850. For example, when a physical power key is pushed, power of the electronic device 1800 may be blocked.

The sensor module 1840 (e.g., a omnidirectional sensor 220 of FIG. 2) may include some or all of a gesture sensor for sensing a motion and/or gesture of a subject, a gyro sensor for measuring an angular speed of the UAV during flying, an atmospheric pressure sensor (e.g., a barometer) for measuring a change in atmospheric pressure and/or atmospheric pressure, a magnetic sensor (e.g., a geomagnetic sensor, a terrestrial magnetism sensor, or a compass sensor) for measuring an earth's magnetic field, an acceleration sensor for measuring acceleration of the electronic device 1800 during flying, a proximity sensor (including an ultrasonic sensor for measuring distance by outputting ultrasonic waves and measuring a signal reflected from the object) for measuring a proximity state and distance of an object, an optical sensor (e.g., an optical flow sensor (OFS)) for recognizing ground topography or a ground pattern and calculating a location, a biometric sensor for user authentication, a temperature/humidity sensor for measuring temperature and humidity, an illuminance sensor for measuring illuminance, or an ultraviolet (UV) sensor for measuring ultraviolet rays. The sensor module 1840 according to various embodiments may calculate an attitude of the electronic device 1800. The sensor module 1840 may share attitude information of the electronic device 1800 with the movement control module 1860.

The memory 1830 (e.g., a memory 230 of FIG. 2) may include an internal memory or an external memory. The memory 1830 may store a command or data associated with at least one other element(s) of the electronic device 1800. The memory 1830 may store software and/or a program. The program may include a kernel, middleware, an application programming interface (API), an application program (or an application), and/or the like.

The audio module may convert, for example, a sound and an electric signal in dual directions. The audio module may include a speaker and a microphone and may process input or output sound information.

The indicator 1880 may display a specific state of the electronic device 1800 or a specific state of a portion (e.g., the processor 1810) of the electronic device 1800, for example, an operation state, a charging state, or the like. Alternatively, the indicator 1880 may display a flight state or an operation mode of the electronic device 1800.

The power management module 1895 may manage, for example, power of the electronic device 1800. According to an embodiment, the power management module 1895 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method, an electromagnetic method, or the like and may further include an additional circuit for wireless charging, for example, a coil loop, a resonant circuit, a rectifier, or the like. The battery gauge may measure, for example, a remaining capacity of the battery 1896 and a voltage, current or temperature thereof while the battery 1896 is charged.

The battery 1896 may include, for example, a rechargeable battery and/or a solar cell.

The camera module 1871 (e.g., an omnidirectional sensor 220 of FIG. 2) may be included in the electronic device 1800. Alternatively, when the electronic device 1800 includes the gimbal module 1870, the camera module 1871 may be included in the gimbal module 1870. The camera module 1871 may include a lens, an image sensor, an image processing unit, or a camera controller. The camera controller may adjust up, down, left, and right angles of a camera lens based on composition information and/or camera control information output from the processor 1810 to adjust a composition of a subject and/or a camera angle (an image capture angle). The image sensor may include a row driver, a pixel array, a column driver, and the like. The image processing unit may include an image preprocessing unit, an image post-processing unit, a still image codec, a moving image codec, and the like. The image processing unit may be included in the processor 1810. The camera controller may control focusing, tracking, and the like.

The camera module 1871 may perform an image capture operation in a driving mode. The camera module 1871 may be influenced by motion of the electronic device 1800. The camera module 1871 may be located in the gimbal module 1870 to reduce a change in image capture of the camera module 1871 according to motion of the electronic device 1800.

The movement control module 1860 (e.g., a movement control module 240 of FIG. 2) may control an attitude and movement of the electronic device 1800 using location and attitude information of the electronic device 1800. The movement control module 1860 may control roll, pitch, yaw, throttle, or the like of the electronic device 1800 depending on obtained location and attitude information. The movement control module 1860 may control an autonomous flight operation based on a hovering flight operation and an autonomous flight command (e.g., a distance and altitude movement horizontal and azimuth command or the like) provided to the processor 1810 and may control a flight operation based on a received user input command. For example, when the movement control module 1860 is a quadcopter, the movement control module 1860 may include a plurality of movement control modules (e.g., a microprocessor unit (MPU)), a motor driving module, a motor module, and a propeller. The plurality of movement control modules (e.g., the MPU) may output control data for rotating the propeller in response to controlling a flight operation. The motor driving module may convert motor control data corresponding to outputs of the plurality of movement control modules into a driving signal and may output the driving signal. The motor module may control rotation of the propeller based on a driving signal of the motor driving module corresponding to the motor module.

The gimbal module 1870 may include, for example, a gimbal control module 1874, a sensor 1872, a motor driving module 1873, and a motor 1875. The gimbal module 1870 may further include the camera module 1871. The gimbal module 1870 may generate compensation data according to motion of the electronic device 1800. The compensation data may be data for controlling at least a portion of pitch, roll, or yaw of the camera module 1871. For example, the roll, pitch, and yaw motor 1875 may compensate roll, pitch, and yaw angles of the camera module 1871 depending on motion of the electronic device 1800. The camera module 1871 may be mounted on the gimbal module 1870, and the gimbal module 1870 may offset motion by rotation (e.g., pitch and roll) of the electronic device 1800 (e.g., a multicopter) to stabilize the camera module 1871 in a correct stand state. The gimbal module 1870 may capture a stable image to maintain the camera module 1871 at a predetermined tilt irrespective of motion of the electronic device 1800. The gimbal control module 1874 may include the sensor module 1872 including a gyro sensor and an acceleration sensor. The gimbal control module 1874 may analyze a value measured by the sensor module 1872 including the gyro sensor and the acceleration sensor to generate a control signal of the motor driving module 1873 and may drive the motor 1875.

Figure 19:
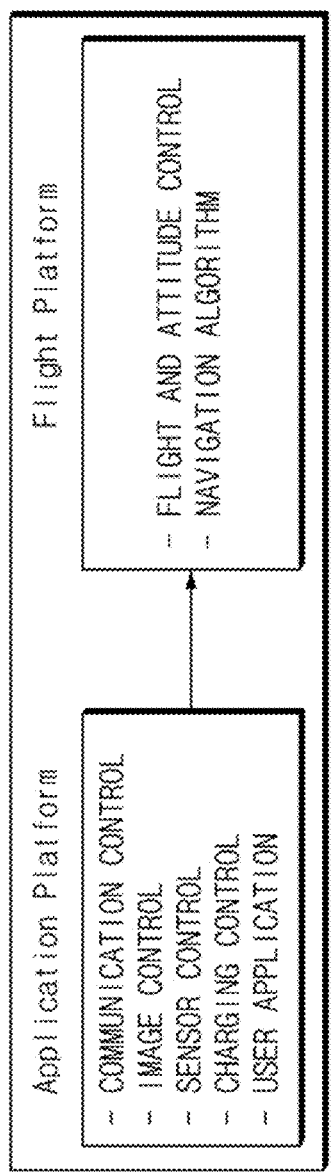
FIG. 19 illustrates a block diagram of a program module (a platform structure) of an electronic device for tracking a subject according to various embodiments of the present disclosure.

FIG. 19 illustrates a block diagram of a program module (a platform structure) of an electronic device for tracking a subject according to various embodiments of the present disclosure.

An electronic device (e.g., an electronic device 1800 of FIG. 18) may include an application platform or a flight platform. The electronic device 1800 may include at least one or more of the application platform for wirelessly receiving a control signal from an external electronic device (e.g., a remote control device 30 of FIG. 1), driving the electronic device 1800, and providing a service, the flight platform for controlling flight depending on a navigation algorithm, or the like.

The application platform may perform communication control (e.g., connectivity), image control, sensor control, or charging control of elements of the electronic device 1800, a change in operation according to a user application, or the like. The application platform may be executed by a processor (e.g., a processor 1810 of FIG. 18). The flight platform may execute flight, attitude control, or a navigation algorithm of the electronic device 1800. The flight platform may be executed by the processor 1810 or a movement control module 1860 of FIG. 18.

The application platform may transmit a control signal to the flight platform while performing communication control, image control, sensor control, charging control, or the like.

According to various embodiments, the processor 1810 may obtain an image of a subject is captured by a camera module 1871 of FIG. 18. The processor 1810 may analyze the obtained image to generate a command for controlling flight of the electronic device 1800. For example, the processor 1810 may generate size information of an obtained subject, a movement state of the subject, a relative distance and altitude between an image capture device and the subject, and azimuth information. The processor 1810 may generate a following flight control signal of the electronic device 1800 using the generated information. The flight platform may control the movement control module 1860 based on a received control signal such that the electronic device 1800 flies (to control altitude and movement of the electronic device 1800).

According to various embodiments, the processor 1810 may measure a location, a flight attitude, an attitude angular speed, acceleration, or the like of the electronic device 1800 through a sensor module including a GPS module. Output information of the sensor module 1840 including the GPS module may be generated and may be basic information of a control signal for navigation/automatic control of the electronic device 1800. Information of an atmospheric pressure sensor for measuring an altitude through an atmospheric pressure difference according to flight of the electronic device 1800 and information about ultrasonic sensors for measuring an accurate altitude at a low altitude may be used as basic information. In addition, a control data signal received from a remote controller, battery state information of the electronic device 1800, or the like may be used as basic information of a control signal.

The electronic device 1800 may fly using, for example, a plurality of propellers. The plurality of propellers may change torque of a motor to momentum. The electronic device 1800 may be referred to as a quadcopter when the number of rotors (propellers) is 4, may be referred to as a hexacopter when the number of rotors (propellers) is 6, and may be referred to as an octocopter when the number of rotors (propellers) is 8.

The electronic device 1800 may control the plurality of propellers based on a received control signal. The electronic device 1800 may fly based on two principles of lift/torque. The electronic device 1800 may rotate a half of multiple propellers in a clockwise direction for rotation and may rotate the other half in a counterclockwise direction for rotation. 3D coordinates according to flight of the electronic device 1800 may be determined by pitch Y/roll X/yaw Z. The electronic device 1800 may fly by tilting back and forth/right and left. When tilting the electronic device 1800, flow of air generated by a propeller module (a rotor) may be changed in direction. For example, when the electronic device 1800 is tilted forward, air may go backward slightly as well as flowing up and down. Thus, a fuselage of the electronic device 1800 may go forward according to the law of action/reaction as much as an air space is pushed backward. A method for tilting the electronic device 1800 may be performed by decreasing a speed of a front of a corresponding direction and increasing a speed of a rear of the corresponding direction. Since this method is common to all directions, the electronic device 1800 may be tilted and moved by adjusting only a speed of a motor module (or a rotor) of FIG. 18.

As the flight platform of the electronic device 1800 receives a control signal generated by the application platform and controls the motor module, the electronic device 1800 may perform flight control according to attitude control and a movement path of pitch Y/roll X/yaw Z of the electronic device 1800.

Figure 20:
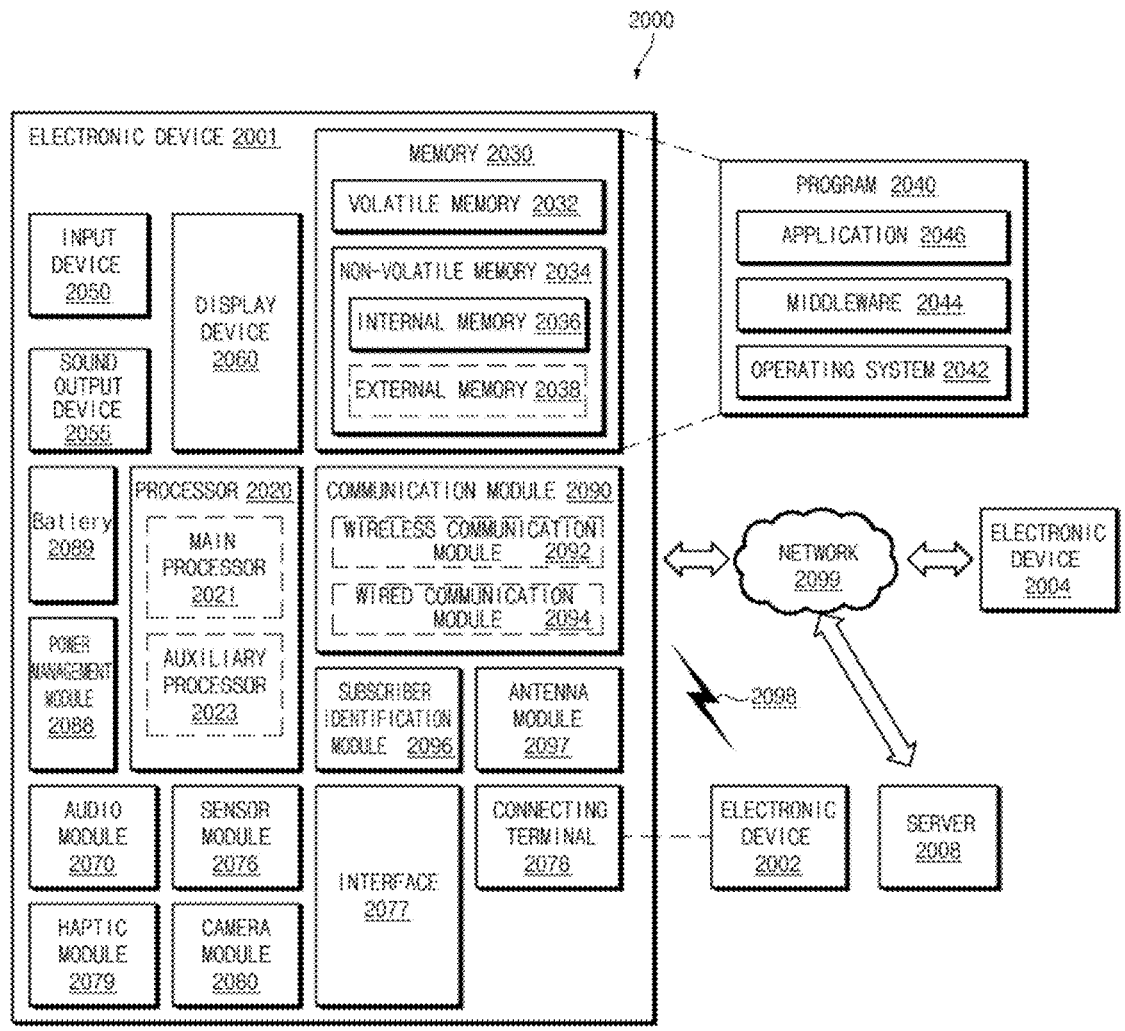
FIG. 20 illustrates a block diagram of an electronic device 2001 in a network environment 2000 for tracking a subject according to various embodiments of the present disclosure.

FIG. 20 illustrates a block diagram of an electronic device 2001 (the remote control device 30 of FIG. 3) in a network environment 2000 for tracking a subject according to various embodiments of the present disclosure. Referring to FIG. 20, the electronic device 2001 may communicate with an electronic device 2002 (e.g., the UAV 20 of FIG. 2) through a first network 2098 (e.g., a short-range wireless communication) or may communicate with an electronic device 2004 or a server 2008 through a second network 2099 (e.g., a long-distance wireless communication) in the network environment 2000. According to an embodiment, the electronic device 2001 may communicate with the electronic device 2004 through the server 2008. According to an embodiment, the electronic device 2001 may include a processor 2020 (e.g., the processor 350 of FIG. 3), a memory 2030 (e.g., the memory 340 of FIG. 3), an input device 2050 (e.g., the input module 310 of FIG. 3), a sound output device 2055, a display device 2060 (e.g., the display 330 of FIG. 3), an audio module 2070, a sensor module 2076, an interface 2077, a haptic module 2079, a camera module 2080, a power management module 2088, a battery 2089, a communication module 2090 (e.g., the communication module 320 of FIG. 3), a subscriber identification module 2096, and an antenna module 2097. According to some embodiments, at least one (e.g., the display device 2060 or the camera module 2080) among components of the electronic device 2001 may be omitted or other components may be added to the electronic device 2001. According to some embodiments, some components may be integrated and implemented as in the case of the sensor module 2076 (e.g., a fingerprint sensor, an iris sensor, or an illuminance sensor) embedded in the display device 2060 (e.g., a display).

The processor 2020 may operate, for example, software (e.g., a program 2040) to control at least one of other components (e.g., a hardware or software element) of the electronic device 2001 connected to the processor 2020 and may process and compute a variety of data. The processor 2020 may load a command set or data, which is received from other components (e.g., the sensor module 2076 or the communication module 2090), into a volatile memory 2032, may process the loaded command or data, and may store result data into a nonvolatile memory 1334. According to an embodiment, the processor 2020 may include a main processor 2021 (e.g., a central processing unit or an application processor) and a co-processor 1323 (e.g., a graphic processing device, an image signal processor, a sensor hub processor, or a communication processor), which operates independently from the main processor 2021, additionally or alternatively uses less power than the main processor 2021, or is specified to a designated function. In this case, the coprocessor 1323 may operate separately from the main processor 2021 or embedded.

In this case, the coprocessor 2023 may control, for example, at least some of functions or states associated with at least one component (e.g., the display device 2060, the sensor module 2076, or the communication module 2090) among the components of the electronic device 2001 instead of the main processor 2021 while the main processor 2021 is in an inactive (e.g., sleep) state or together with the main processor 2021 while the main processor 2021 is in an active (e.g., an application execution) state. According to an embodiment, the coprocessor 1323 (e.g., the image signal processor or the communication processor) may be implemented as a part of another component (e.g., the camera module 2080 or the communication module 2090) that is functionally related to the coprocessor 1323. The memory 2030 may store a variety of data used by at least one component (e.g., the processor 2020 or the sensor module 2076) of the electronic device 2001, for example, software (e.g., the program 2040) and input data or output data with respect to commands associated with the software. The memory 2030 may include the volatile memory 2032 or the nonvolatile memory 2034.

The program 2040 may be stored in the memory 2030 as software and may include, for example, an operating system 2042, a middleware 2044, or an application 2046.

The input device 2050 may be a device for receiving a command or data, which is used for a component (e.g., the processor 2020) of the electronic device 2001, from an outside (e.g., a user) of the electronic device 2001 and may include, for example, a microphone, a mouse, or a keyboard.

The sound output device 2055 may be a device for outputting a sound signal to the outside of the electronic device 2001 and may include, for example, a speaker used for general purposes, such as multimedia play or recordings play, and a receiver used only for receiving calls. According to an embodiment, the receiver and the speaker may be either integrally or separately implemented.

The display device 2060 may be a device for visually presenting information to the user and may include, for example, a display, a hologram device, or a projector and a control circuit for controlling a corresponding device. According to an embodiment, the display device 2060 may include a touch circuitry or a pressure sensor for measuring an intensity of pressure on the touch.

The audio module 2070 may convert a sound and an electrical signal in dual directions. According to an embodiment, the audio module 2070 may obtain the sound through the input device 2050 or may output the sound through an external electronic device (e.g., the electronic device 2002 (e.g., a speaker or a headphone)) wired or wirelessly connected to the sound output device 2055 or the electronic device 2001.

The sensor module 2076 may generate an electrical signal or a data value corresponding to an operating state (e.g., power or temperature) inside or an environmental state outside the electronic device 2001. The sensor module 2076 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 2077 may support a designated protocol wired or wirelessly connected to the external electronic device (e.g., the electronic device 2002). According to an embodiment, the interface 2077 may include, for example, an high-definition multimedia interface (HDMI), a universal serial bus (USB) interface, an SD card interface, or an audio interface.

A connection terminal 2078 may include a connector that physically connects the electronic device 2001 to the external electronic device (e.g., the electronic device 2002), for example, an HDMI connector, a USB connector, an SD card connector, or an audio connector (e.g., a headphone connector).

The haptic module 2079 may convert an electrical signal to a mechanical stimulation (e.g., vibration or movement) or an electrical stimulation perceived by the user through tactile or kinesthetic sensations. The haptic module 2079 may include, for example, a motor, a piezoelectric device, or an electric stimulator.

The camera module 2080 may shoot a still image or a video image. According to an embodiment, the camera module 2080 may include, for example, at least one lens, an image sensor, an image signal processor, or a flash.

The power management module 2088 may be a module for managing power supplied to the electronic device 2001 and may serve as at least a part of a power management integrated circuit (PMIC).

The battery 2089 may be a device for supplying power to at least one component of the electronic device 2001 and may include, for example, a non-rechargeable (primary) battery, a rechargeable (secondary) battery, or a fuel cell.

The communication module 2090 may establish a wired or wireless communication channel between the electronic device 2001 and the external electronic device (e.g., the electronic device 2002, the electronic device 2004, or the server 2008) and support communication execution through the established communication channel. The communication module 2090 may include at least one communication processor operating independently from the processor 2020 (e.g., the application processor) and supporting the wired communication or the wireless communication. According to an embodiment, the communication module 2090 may include a wireless communication module 2092 (e.g., a cellular communication module, a short-range wireless communication module, or a GNSS (global navigation satellite system) communication module) or a wired communication module 2094 (e.g., an local area network (LAN) communication module or a power line communication module) and may communicate with the external electronic device using a corresponding communication module among them through the first network 2098 (e.g., the short-range communication network such as a BT, a Wi-Fi direct, or an infrared data association (IrDA)) or the second network 2099 (e.g., the long-distance wireless communication network such as a cellular network, an internet, or a computer network (e.g., LAN or WAN)). The above-mentioned various communication modules 2090 may be implemented into one chip or into separate chips, respectively.

According to an embodiment, the wireless communication module 2092 may identify and authenticate the electronic device 2001 using user information stored in the subscriber identification module 2096 in the communication network.

The antenna module 2097 may include one or more antennas to transmit or receive the signal or power to or from an external source. According to an embodiment, the communication module 2090 (e.g., the wireless communication module 2092) may transmit or receive the signal to or from the external electronic device through the antenna suitable for the communication method.

Some components among the components may be connected to each other through a communication method (e.g., a bus, a general purpose input/output (GPIO), an serial peripheral interface (SPI), or an mobile industry processor interface (MIPI)) used between peripheral devices to exchange signals (e.g., a command or data) with each other.

According to an embodiment, the command or data may be transmitted or received between the electronic device 2001 and the external electronic device 2004 through the server 2008 connected to the second network 2099. Each of the electronic devices 2002 and 2004 may be the same or different types as or from the electronic device 2001. According to an embodiment, all or some of the operations performed by the electronic device 2001 may be performed by another electronic device or a plurality of external electronic devices. When the electronic device 2001 performs some functions or services automatically or by request, the electronic device 2001 may request the external electronic device to perform at least some of the functions related to the functions or services, in addition to or instead of performing the functions or services by itself. The external electronic device receiving the request may carry out the requested function or the additional function and transmit the result to the electronic device 2001. The electronic device 2001 may provide the requested functions or services based on the received result as is or after additionally processing the received result. To this end, for example, a cloud computing, distributed computing, or client-server computing technology may be used.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 2020, may cause the one or more processors to perform a function corresponding to the instruction. The computer-readable storage media, for example, may be the memory 2030.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a sensor configured to sense at least one external object in a direction of 360 degrees outside the electronic device, wherein the sensor comprises one or more cameras configured to capture images for a 360-degree direction of a lateral direction or a longitudinal direction outside the electronic device;
   an actuator configured to allow the electronic device to move or yaw; and
   a processor operably connected to the sensor and the actuator,
   wherein the processor is configured to:
      generate an omnidirectional image mapped onto a virtual spherical surface relative to the electronic device, based on the captured images;
      verify an angle corresponding to a location of the at least one external object among the 360 degrees and a distance between the at least one external object and the electronic device based at least in part on the omnidirectional image; and
      when the distance does not belong to a specified range, move the electronic device from a first position to a second position according to a direction corresponding to the angle using the actuator such that the distance belongs to the specified range, based on the omnidirectional image, wherein a first heading of the electronic device in the first position is a same as a second heading of the electronic device in the second position, and wherein the angle is different from the first heading and the second heading.

2. The electronic device of claim 1, further comprising:
a communication module configured to communicate with another electronic device,
wherein the processor is operably connected to the communication module, and wherein the processor is further configured to:
when receiving selection information about a partial heading angle range among the 360 degrees via the communication module, verify whether the angle belongs to the partial heading angle range; and
when the angle does not belong to the partial heading angle range, move the electronic device such that the angle belongs to the partial heading angle range.

3. The electronic device of claim 2, wherein the processor is further configured to:
when the angle belongs to the partial heading angle range and when the distance does not belong to a second specified range, move the electronic device in a direction corresponding to the angle such that the distance belongs to the second specified range.

4. The electronic device of claim 1, further comprising:
a global positioning system (GPS) module and a communication module,
wherein the processor is operably connected to the GPS module and the communication module, and wherein the processor is further configured to:
verify GPS coordinates of the electronic device using the GPS module;
receive GPS coordinates of the at least one external object via the communication module; and
verify the distance based at least in part on the GPS coordinates of the electronic device and the GPS coordinates of the at least one external object.

5. The electronic device of claim 1, further comprising:
a communication module configured to communicate with another electronic device,
wherein the processor is operably connected to the communication module and wherein the processor is further configured to:
detect one or more external objects included in the omnidirectional image;
transmit external object information, associated with the one or more detected external objects, including the omnidirectional image and the angle to the other electronic device via the communication module;
receive object information associated with an external object selected by a user among the one or more detected external objects from the other electronic device; and
detect the selected external object corresponding to the received object information using the sensor.

6. The electronic device of claim 5, wherein the processor is further configured to:
when the selected external object is one external object, verify an angle corresponding to a location of the one external object and a distance between the one external object and the electronic device; and
when the distance between the one external object and the electronic device does not belong to the specified range, move the electronic device in a direction corresponding to the angle such that the distance between the one external object and the electronic device belongs to the specified range.

7. The electronic device of claim 5, wherein the processor is further configured to:
when the selected external object is a plurality of external objects, verify a plurality of angles corresponding to locations of the plurality of external objects and distances between the plurality of external objects and the electronic device;
when at least one of the verified distances does not belong to a second specified range, calculate a location where each of the verified distances belongs to the second specified range; and
move the electronic device in a direction corresponding to an angle of the calculated location.

8. The electronic device of claim 7, wherein the processor is further configured to:
when it is impossible to calculate the location where each of the verified distances belongs to the second specified range, select at least one of the plurality of external objects;
calculate a location where a distance between the at least one selected external object and the electronic device belongs to the second specified range; and
move the electronic device in a direction corresponding to an angle of the calculated location.

9. The electronic device of claim 5, wherein the processor is further configured to:
when the selected object is a plurality of external objects, verify a plurality of angles corresponding to locations of the plurality of external objects, distances between the plurality of external objects and the electronic device, and priorities of the plurality of external objects;
calculate a second location where a distance between one or more external objects, the priorities of external objects are greater than or equal to a specified ranking, and the electronic device belongs to a second specified range; and
move the electronic device in a direction corresponding to an angle of the second location.

10. The electronic device of claim 1, wherein the processor is further configured to:
when the distance belongs to the specified range, control the electronic device to maintain a location of the electronic device.

* * * * *